US012658947B2

(12) United States Patent (10) Patent No.: US 12,658,947 B2
Hanaoka (45) Date of Patent: Jun. 16, 2026

(54) RADIO FREQUENCY CIRCUIT AND COMMUNICATION DEVICE

(71) Applicant: Murata Manufacturing Co., Ltd., Nagaokakyo (JP)

(72) Inventor: Kunitoshi Hanaoka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 302 days.

(21) Appl. No.: 18/420,811

(22) Filed: Jan. 24, 2024

(65) Prior Publication Data

US 2024/0214009 A1 Jun. 27, 2024

Related U.S. Application Data

(63) Continuation of application No. PCT/JP2022/019911, filed on May 11, 2022.

(30) Foreign Application Priority Data

Aug. 6, 2021 (JP) ................................. 2021-130114

(51) Int. Cl.
$$H04B\ 1/00 \quad (2006.01)$$
$$H04B\ 1/04 \quad (2006.01)$$
(Continued)

(52) U.S. Cl.
CPC ............. *H04B 1/0078* (2013.01); *H04B 1/04* (2013.01); *H04B 1/18* (2013.01); *H04B 1/40* (2013.01)

(58) Field of Classification Search
CPC .......... H04B 1/0078; H04B 1/04; H04B 1/00; H04B 1/006; H04B 1/18; H04B 1/40; H03H 7/38
See application file for complete search history.

(56) References Cited

U.S. PATENT DOCUMENTS

| 10,038,409 B2 * | 7/2018 | Nobbe ..................... H04L 27/20 |
| 10,284,235 B2 * | 5/2019 | Thompson ............. H04B 1/006 |

(Continued)

FOREIGN PATENT DOCUMENTS

| CN | 101383628 A | 3/2009 |
| CN | 110620589 A | 12/2019 |

(Continued)

OTHER PUBLICATIONS

International Search Report and Written Opinion mailed on Aug. 2, 2022, received for PCT Application PCT/JP2022/019911, filed on May 11, 2022, 8 pages including English Translation.

(Continued)

*Primary Examiner* — Dominic E Rego
(74) *Attorney, Agent, or Firm* — XSENSUS LLP

(57) ABSTRACT

A radio frequency circuit includes an antenna terminal, a transmission filter, multiple reception filters, a first switch, and a second switch. In the first switch, a first terminal is connectable to a second terminal or a third terminal. In the second switch, a fourth terminal is connectable to a fifth terminal. The multiple reception filters are connected to the second terminal or the third terminal of the first switch. The first terminal of the first switch is connected to the antenna terminal. The fourth terminal of the second switch is connected to the second terminal of the first switch. The fifth terminal of the second switch is connected to the transmission filter.

18 Claims, 7 Drawing Sheets

(51) Int. Cl.
  *H04B 1/18*  (2006.01)
  *H04B 1/40*  (2015.01)

(56) References Cited

U.S. PATENT DOCUMENTS

| | | | | |
|---|---|---|---|---|
| 10,854,956 B2* | 12/2020 | Son | | H01Q 1/243 |
| 11,515,905 B2* | 11/2022 | Knopik | | H04B 1/44 |
| 2009/0190563 A1* | 7/2009 | Lee | | H04B 7/082 |
| | | | | 370/337 |
| 2009/0256645 A1* | 10/2009 | Satoh | | H04B 1/006 |
| | | | | 333/132 |
| 2011/0021245 A1* | 1/2011 | Taniuchi | | H04B 1/50 |
| | | | | 455/560 |
| 2013/0051287 A1* | 2/2013 | Aramata | | H04B 1/525 |
| | | | | 370/278 |
| 2014/0073268 A1* | 3/2014 | Taniuchi | | H01P 1/10 |
| | | | | 333/101 |
| 2014/0167877 A1* | 6/2014 | Shimizu | | H03H 7/463 |
| | | | | 333/101 |
| 2014/0225680 A1* | 8/2014 | Fujiwara | | H04B 1/0483 |
| | | | | 333/133 |
| 2015/0280774 A1* | 10/2015 | Uejima | | H04B 1/40 |
| | | | | 455/78 |
| 2015/0295595 A1* | 10/2015 | Uejima | | H04B 1/0064 |
| | | | | 455/78 |
| 2016/0134566 A1* | 5/2016 | De Ranter | | H04B 1/006 |
| | | | | 370/392 |
| 2016/0285490 A1* | 9/2016 | Hanaoka | | H04B 1/16 |
| 2017/0012599 A1* | 1/2017 | Iwanaga | | H03H 7/46 |
| 2017/0012763 A1* | 1/2017 | Wu | | H04L 5/1461 |
| 2017/0104509 A1 | 4/2017 | Khlat et al. | | |
| 2017/0244374 A1* | 8/2017 | Yoshida | | H01P 5/16 |
| 2018/0026671 A1* | 1/2018 | Uejima | | H04B 1/50 |
| | | | | 455/78 |
| 2018/0048308 A1* | 2/2018 | Oshita | | H03K 17/002 |
| 2018/0091187 A1* | 3/2018 | Uejima | | H04B 1/56 |
| 2018/0132192 A1* | 5/2018 | Yang | | H04B 7/0682 |
| 2018/0167094 A1* | 6/2018 | Aramata | | H04B 1/52 |
| 2018/0241369 A1* | 8/2018 | Ghim | | H04W 72/0453 |
| 2018/0331434 A1* | 11/2018 | Iiduka | | H04B 1/18 |
| 2018/0331703 A1* | 11/2018 | Horita | | H04B 1/48 |
| 2019/0103843 A1* | 4/2019 | Aikawa | | H03F 3/189 |
| 2019/0214959 A1* | 7/2019 | Nosaka | | H04B 1/401 |
| 2019/0273528 A1* | 9/2019 | Watanabe | | H04B 1/18 |
| 2019/0280668 A1* | 9/2019 | Harada | | H04B 1/0057 |
| 2019/0312608 A1* | 10/2019 | Muto | | H04B 1/0458 |
| 2019/0386634 A1* | 12/2019 | Yasuda | | H03H 7/075 |
| 2020/0083865 A1* | 3/2020 | Mori | | H03H 9/706 |
| 2020/0177214 A1* | 6/2020 | Nagumo | | H03F 3/19 |
| 2020/0343930 A1 | 10/2020 | DiTommaso et al. | | |
| 2021/0297095 A1* | 9/2021 | Tran | | H03F 3/195 |
| 2022/0294351 A1* | 9/2022 | Li | | H02M 1/0025 |

FOREIGN PATENT DOCUMENTS

| | | |
|---|---|---|
| WO | 2019/188290 A1 | 10/2019 |
| WO | 2019/235276 A1 | 12/2019 |
| WO | 2020/183985 A1 | 9/2020 |

OTHER PUBLICATIONS

Office Action issued on May 6, 2026, in corresponding Chinese patent Application No. 202280053875.0, 7 pages.

* cited by examiner

FIG. 10A                FIG. 10B                    FIG. 10C

RADIO FREQUENCY CIRCUIT AND COMMUNICATION DEVICE

CROSS-REFERENCE TO RELATED APPLICATIONS

This is a continuation application of PCT/JP2022/019911, filed on May 11, 2022, designating the United States of America, which is based on and claims priority to Japanese Patent Application No. JP 2021-130114 filed on Aug. 6, 2021. The entire contents of the above-identified applications, including the specifications, drawings and claims, are incorporated herein by reference in their entirety.

TECHNICAL FIELD

The present disclosure generally relates to a radio frequency circuit and a communication device, and more specifically to a radio frequency circuit that includes multiple filters and a communication device that includes a radio frequency circuit.

BACKGROUND ART

Patent Document 1 discloses a multiplexer that includes a switch and a duplexer. The switch includes a common terminal and a selection terminal. The duplexer includes a transmission filter and a reception filter. An antenna terminal is connected to the common terminal of the switch. The duplexer (the transmission filter and the reception filter) is connected to the selection terminal of the switch.

CITATION LIST

Patent Document

Patent Document 1: International Publication No. 2019/235276

SUMMARY OF DISCLOSURE

Technical Problem

As for the multiplexer disclosed in Patent Document 1, a first filter (the reception filter) and a second filter (the transmission filter) are bunched, and receiving sensitivity is degraded due to a bunch loss in some cases.

It is an object of the present disclosure to provide a radio frequency circuit and a communication device that can reduce the degradation of the receiving sensitivity due to the bunch loss.

Solution to Problem

A radio frequency circuit according to an aspect of the present disclosure includes an antenna terminal, a transmission filter, multiple reception filters, a first switch, and a second switch. The first switch includes a first terminal, a second terminal, and a third terminal. The second switch includes a fourth terminal and a fifth terminal. In the first switch, the first terminal is connectable to the second terminal or the third terminal. In the second switch, the fourth terminal is connectable to the fifth terminal. The multiple reception filters are connected to the second terminal or the third terminal of the first switch. The first terminal of the first switch is connected to the antenna terminal. The fourth terminal of the second switch is connected to the second terminal of the first switch. The fifth terminal of the second switch is connected to the transmission filter.

A communication device according to an aspect of the present disclosure includes the radio frequency circuit and a signal processing circuit. The signal processing circuit is connected to the radio frequency circuit.

Advantageous Effects of Disclosure

A radio frequency circuit and a communication device according to an aspect of the present disclosure can reduce the degradation of receiving sensitivity due to a bunch loss.

DESCRIPTION OF EMBODIMENTS

Radio frequency circuits and communication devices according to a first embodiment to a sixth embodiment will hereinafter be described with reference to the drawings.

First Embodiment (1) Radio Frequency Circuit

The structure of a radio frequency circuit 1 according to the first embodiment will now be described with reference to the drawings.

Figure 2:
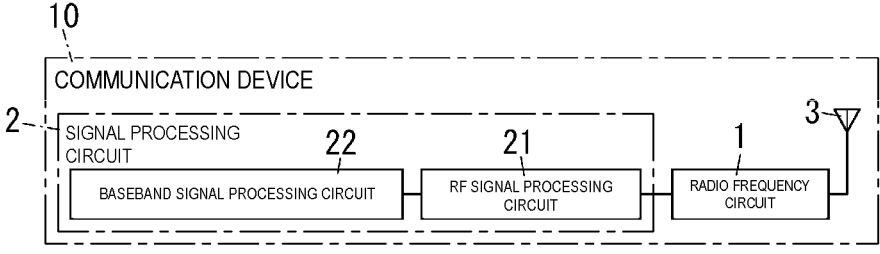
FIG. 2 schematically illustrates a communication device according to the first embodiment.

As illustrated in FIG. 2, the radio frequency circuit 1 is used for, for example, a communication device 10. An example of the communication device 10 is a cellular phone such as a smart phone. The communication device 10 is not limited to a cellular phone but may be, for example, a wearable terminal such as a smart watch. An example of the radio frequency circuit 1 is a circuit that can support, for example, a 4G (fourth generation mobile communication) standard or a 5G (fifth generation mobile communication) standard. An example of the 4G standard is the 3GPP (a registered trademark, Third Generation Partnership Project) LTE (a registered trademark, Long Term Evolution) standard. An example of the 5G standard is 5G NR (New Radio).

An example of the radio frequency circuit 1 is a circuit that can support carrier aggregation and dual connectivity.

The carrier Aggregation and the dual connectivity mean techniques that is used for communication in which radio waves in multiple frequency bands are simultaneously used. In the following description, signal communication with the carrier aggregation or the dual connectivity is also referred to as simultaneous communication. To enable the simultaneous communication means that signals can be received and transmitted by using the carrier aggregation or the dual connectivity.

The communication device 10 communicates in multiple communication bands. More specifically, the communication device 10 transmits transmission signals in the multiple communication bands and receives reception signals in the multiple communication bands. Specifically, the radio frequency circuit 1 receives a reception signal in a first communication band, a reception signal in a second communication band, a reception signal in a third communication band, and a reception signal in a fourth communication band. The radio frequency circuit 1 transmits a transmission signal in the first communication band, a transmission signal in the second communication band, and a transmission signal in a fifth communication band.

Some of the transmission signals and the reception signals in the multiple communication bands are, for example, FDD (Frequency Division Duplex) signals. The transmission signals and the reception signals in the multiple communication bands are not limited to FDD signals but may be, for example, TDD (Time Division Duplex) signals. FDD is a technique for wireless communication in which different frequency bands are assigned to transmission and reception in the wireless communication for the transmission and reception. TDD is a technique for wireless communication in which the same frequency band is assigned to transmission and reception in the wireless communication, and the transmission and the reception are periodically switched.

(2) Circuit Structure of Radio Frequency Circuit

Figure 1:
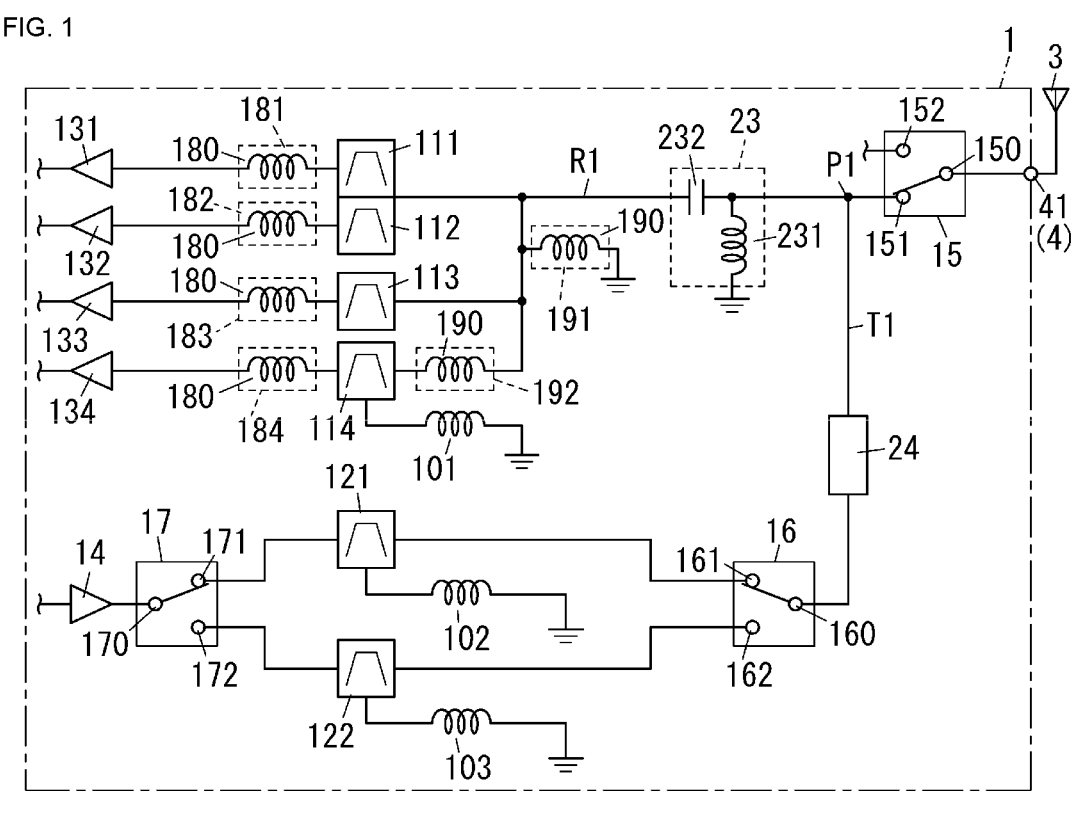
FIG. 1 schematically illustrates a radio frequency circuit according to a first embodiment.

The circuit structure of the radio frequency circuit 1 according to the first embodiment will now be describe with reference to FIG. 1.

As illustrated in FIG. 1, the radio frequency circuit 1 according to the first embodiment includes multiple (four in an illustrated example) reception filters 111 to 114, multiple (two in the illustrated example) transmission filters 121 and 122, multiple (four in the illustrated example) low-noise amplifiers 131 to 134, and a power amplifier 14. The radio frequency circuit 1 according to the first embodiment further includes a first switch 15, a second switch 16, and a third switch 17. The radio frequency circuit 1 according to the first embodiment further includes multiple (four in the illustrated example) input matching circuits 181 to 184 and multiple (four in the illustrated example) matching circuits 23, 24, 191, and 192. The radio frequency circuit 1 according to the first embodiment further includes external connection terminals 4.

(2.1) Reception Filter

The multiple reception filters 111 to 114 allow reception signals in different communication bands to pass therethrough. More specifically, the reception filter 111 allows the reception signal in the third communication band to pass therethrough. The reception filter 112 allows the reception signal in the first communication band to pass therethrough. The reception filter 113 allows the reception signal in the second communication band to pass therethrough. The reception filter 114 allows the reception signal in the fourth communication band to pass therethrough. As for the radio frequency circuit 1 according to the first embodiment, the reception filter 111 and the reception filter 112 are a one-chip. The phrase "the reception filter 111 and the reception filter 112 are a one-chip" means that a circuit that is included in the reception filter 111 and a circuit that is included in the reception filter 112 are formed on a common (a single) substrate.

An example of the first communication band is Band1 of the 3GPP LTE standard, and the reception band of the first communication band is 2110 MHz to 2170 MHz. An example of the second communication band is Band3 of the 3GPP LTE standard, and the reception band of the second communication band is 1805 MHz to 1880 MHz. An example of the third communication band is Band40 of the 3GPP LTE standard, and the reception band of the third communication band is 2300 MHz to 2400 MHz. An example of the fourth communication band is Band32 of the 3GPP LTE standard, and the reception band of the fourth communication band is 1452 MHz to 1496 MHz.

The reception filter 111 is provided between the low-noise amplifier 131 described later and the first switch 15. The reception filter 112 is provided between the low-noise amplifier 132 described later and the first switch 15. The reception filter 113 is provided between the low-noise amplifier 133 described later and the first switch 15. The reception filter 114 is provided between the low-noise amplifier 134 described later and the first switch 15. The reception filters 111 to 114 allow reception signals in the reception bands of the respective communication bands among radio frequency signals that are inputted from an antenna terminal 41 described later to pass therethrough.

As for the radio frequency circuit 1 according to the first embodiment, as illustrated in FIG. 1, an inductor 101 is connected between a parallel arm resonator that is included in the reception filter 114 and the ground. Consequently, the attenuation pole of the reception filter 114 is adjusted.

(2.2) Transmission Filter

The multiple transmission filters 121 and 122 allow transmission signals in different communication bands to pass therethrough. More specifically, the transmission filter 121 allows the transmission signal in the second communication band and the transmission signal in the fifth communication band to pass therethrough. The transmission filter 122 allows the transmission signal in the first communication band to pass therethrough.

The first communication band is the Band1 of the 3GPP LTE standard as described above, and the transmission band of the first communication band is 1920 MHz to 1980 MHz. The second communication band is the Band3 of the 3GPP LTE standard as described above, and the transmission band of the second communication band is 1710 MHz to 1785 MHz. An example of the fifth communication band is Band66 of the 3GPP LTE standard, and the transmission band of the fifth communication band is 1710 MHz to 1780 MHz. As for the radio frequency circuit 1 according to the first embodiment, the transmission band of the fifth communication band is included in the transmission band of the second communication band.

The multiple transmission filters 121 and 122 are provided between the power amplifier 14 and the second switch 16. The multiple transmission filters 121 and 122 allow transmission signals in the transmission bands of the respective communication bands among radio frequency signals that are amplified by the power amplifier 14 to pass therethrough.

As for the radio frequency circuit 1 according to the first embodiment, as illustrated in FIG. 1, an inductor 102 is connected between a parallel arm resonator that is included in the transmission filter 121 and the ground. An inductor 103 is connected between a parallel arm resonator that is included in the transmission filter 122 and the ground. Consequently, the attenuation pole of the multiple transmission filters 121 and 122 is adjusted.

(2.3) Low-Noise Amplifier

The multiple low-noise amplifiers 131 to 134 amplify the reception signals with a low noise. The low-noise amplifier 131 is provided between a first signal output terminal (not illustrated) and the reception filter 111. The low-noise amplifier 132 is provided between a second signal output terminal (not illustrated) and the reception filter 112. The low-noise amplifier 133 is provided between a third signal output terminal (not illustrated) and the reception filter 113. The low-noise amplifier 134 is provided between a fourth signal output terminal (not illustrated) and the reception filter 114. The first to fourth signal output terminals output the reception signals from the radio frequency circuit 1 to an external circuit (for example, a signal processing circuit 2).

The multiple low-noise amplifiers 131 to 134 include respective input terminals (not illustrated) and respective output terminals (not illustrated). The input terminal of the low-noise amplifier 131 is connected to the input matching circuit 181 described later. The output terminal of the low-noise amplifier 131 is connected to the external circuit (for example, the signal processing circuit 2) with the first signal output terminal interposed therebetween. The input terminal of the low-noise amplifier 132 is connected to the input matching circuit 182 described later. The output terminal of the low-noise amplifier 132 is connected to the external circuit (for example, the signal processing circuit 2) with the second signal output terminal interposed therebetween. The input terminal of the low-noise amplifier 133 is connected to the input matching circuit 183 described later. The output terminal of the low-noise amplifier 133 is connected to the external circuit (for example, the signal processing circuit 2) with the third signal output terminal interposed therebetween. The input terminal of the low-noise amplifier 134 is connected to the input matching circuit 184 described later. The output terminal of the low-noise amplifier 134 is connected to the external circuit (for example, the signal processing circuit 2) with the fourth signal output terminal interposed therebetween.

(2.4) Power Amplifier

The power amplifier 14 amplifies a transmission signal. The power amplifier 14 is provided between a signal input terminal (not illustrated) and the multiple transmission filters 121 and 122. The signal input terminal inputs a transmission signal from the external circuit (for example, the signal processing circuit 2) into the radio frequency circuit 1. The power amplifier 14 includes an input terminal (not illustrated) and an output terminal (not illustrated). The input terminal of the power amplifier 14 is connected to the external circuit (for example, the signal processing circuit 2) with the signal input terminal interposed therebetween. The output terminal of the power amplifier 14 is connected to a common terminal 170 of the third switch 17 and is connectable to the multiple transmission filters 121 and 122 with the third switch 17 interposed therebetween. The power amplifier 14 is controlled by, for example, a controller (not illustrated).

(2.5) Input Matching Circuit

The input matching circuit 181 is provided between the low-noise amplifier 131 and the reception filter 111. The input matching circuit 181 is a circuit for impedance matching between the low-noise amplifier 131 and the reception filter 111.

The input matching circuit 181 includes an inductor 180. The inductor 180 of the input matching circuit 181 faces the input terminal of the low-noise amplifier 131. The input matching circuit 181 is not limited to a structure that includes the single inductor 180 but may have, for example, a structure that includes multiple inductors or a structure that includes multiple inductors and multiple capacitors.

The input matching circuit 182 is provided between the low-noise amplifier 132 and the reception filter 112. The input matching circuit 182 is a circuit for impedance matching between the low-noise amplifier 132 and the reception filter 112.

The input matching circuit 182 includes an inductor 180. The inductor 180 of the input matching circuit 182 faces the input terminal of the low-noise amplifier 132. The input matching circuit 182 is not limited to a structure that includes the single inductor 180 but may have, for example, a structure that includes multiple inductors or a structure that includes multiple inductors and multiple capacitors.

The input matching circuit 183 is provided between the low-noise amplifier 133 and the reception filter 113. The input matching circuit 183 is a circuit for impedance matching between the low-noise amplifier 133 and the reception filter 113.

The input matching circuit 183 includes an inductor 180. The inductor 180 of the input matching circuit 183 faces the input terminal of the low-noise amplifier 133. The input matching circuit 183 is not limited to a structure that includes the single inductor 180 but may have, for example, a structure that includes multiple inductors or a structure that includes multiple inductors and multiple capacitors.

The input matching circuit 184 is provided between the low-noise amplifier 134 and the reception filter 114. The input matching circuit 184 is a circuit for impedance matching between the low-noise amplifier 134 and the reception filter 114.

The input matching circuit 184 includes an inductor 180. The inductor 180 of the input matching circuit 184 faces the input terminal of the low-noise amplifier 134. The input matching circuit 184 is not limited to a structure that includes the single inductor 180 but may have, for example, a structure that includes multiple inductors or a structure that includes multiple inductors and multiple capacitors.

(2.6) Matching Circuit

The matching circuit 191 is provided between the multiple reception filters 111 to 114 and the first switch 15. The matching circuit 191 is a circuit for impedance matching between the multiple reception filters 111 to 114 and the first switch 15.

The matching circuit 191 includes an inductor 190. The inductor 190 of the matching circuit 191 is provided between input terminals (not illustrated) of the multiple reception filters 111 to 114 and the ground. The matching circuit 191 is not limited to a structure that includes the single inductor 190 but may have, for example, a structure that includes multiple inductors or a structure that includes multiple inductors and multiple capacitors.

The matching circuit 192 is provided between the reception filter 114 and the first switch 15. The matching circuit 192 is a circuit for impedance matching between the reception filter 114 and the first switch 15.

The matching circuit 192 includes an inductor 190. The inductor 190 of the matching circuit 192 is provided between the input terminal (not illustrated) of the reception filter 114 and the matching circuit 23. The matching circuit 192 is not limited to a structure that includes the single inductor 190 but may have, for example, a structure that includes multiple inductors or a structure that includes multiple inductors and multiple capacitors.

The matching circuit 23 is provided between the multiple reception filters 111 to 114 and the first switch 15. The matching circuit 23 is a circuit for impedance matching between the multiple reception filters 111 to 114 and the first switch 15.

The matching circuit 23 includes an inductor 231 and a capacitor 232. The inductor 231 of the matching circuit 23 is provided between a signal path R1 and the ground. The capacitor 232 of the matching circuit 23 is provided between the input terminals (not illustrated) of the multiple reception filters 111 to 114 and a selection terminal 151 of the first switch 15. The signal path R1 connects the input terminals of the multiple reception filters 111 to 114 and the selection terminal 151 of the first switch 15 to each other.

As illustrated in FIG. 1, the matching circuit 24 is provided between the selection terminal 151 of the first switch 15 and a common terminal 160 of the second switch 16. The matching circuit 24 greatly increases the impedance of a signal path T1 in the frequency band of the reception band of a reception signal that is received via an antenna 3. Consequently, as for the radio frequency circuit 1 according to the first embodiment, the signal path T1 is open in the frequency band of the reception band of the reception signal described above when viewed from a connection point P1 on the signal path R1. The signal path T1 branches from the connection point P1 on the signal path R1 and connects the connection point P1 and the common terminal 160 of the second switch 16 to each other.

Figures 3A, 3B:
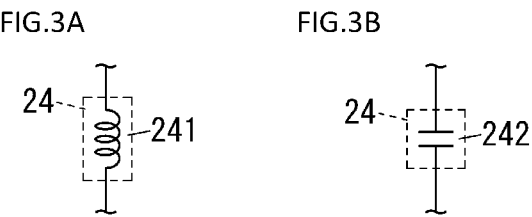
FIG. 3A and FIG. 3B illustrate circuit diagrams of specific examples of a matching circuit that is used for the radio frequency circuit.

As illustrated in FIG. 3A, the matching circuit 24 includes an inductor 241. The inductor 241 of the matching circuit 24 is provided between the connection point P1 on the signal path R1 and the common terminal 160 of the second switch 16.

(2.7) First Switch

The first switch 15 changes a filter that is connected to the antenna terminal 41 into a filter selected from multiple filters including the multiple reception filters 111 to 114 and the multiple transmission filters 121 and 122. That is, the first switch 15 changes a path that is connected to the antenna terminal 41. The first switch 15 includes a common terminal 150 and multiple (two in the illustrated example) selection terminals 151 and 152. The common terminal 150 is connected to the antenna terminal 41.

The selection terminal 151 is connected to the multiple reception filters 111 to 114. The selection terminal 151 is connected to the multiple transmission filters 121 and 122 with the second switch 16 that will be described later interposed therebetween. The selection terminal 152 is connected to a filter other than the multiple reception filters 111 to 114 and the multiple transmission filters 121 and 122 among the multiple filters. As for the radio frequency circuit 1 according to the first embodiment, the common terminal 150 corresponds to a first terminal, and the selection terminal 151 corresponds to a second terminal and a third terminal. That is, the first switch 15 includes the first terminal (the common terminal 150), and the second terminal and the third terminal (the selection terminal 151). In the first switch 15, the first terminal is connectable to at least the second terminal or the third terminal. In the first switch 15, the third terminal doubles as the second terminal.

The first switch 15 changes a connection state between the common terminal 150 and the multiple selection terminals 151 and 152. The first switch 15 is controlled by, for example, the signal processing circuit 2 (see FIG. 2). The first switch 15 electrically connects the common terminal 150 and at least one of the multiple selection terminals 151 and 152 to each other in accordance with a control signal from a RF signal processing circuit 21 (see FIG. 2) of the signal processing circuit 2.

(2.8) Second Switch

The second switch 16 changes a transmission filter that is connected to the antenna terminal 41 into a transmission filter selected from the multiple transmission filters 121 and 122. That is, the second switch 16 changes a path that is connected to the antenna terminal 41. The second switch 16 includes the common terminal 160 and multiple (two in the illustrated example) selection terminals 161 and 162. The common terminal 160 is connected to the selection terminal 151 of the first switch 15. More specifically, the common terminal 160 is connected to the signal path R1 at the connection point P1 on the signal path R1. Consequently, as for the radio frequency circuit 1 according to the first embodiment, the multiple reception filters 111 to 114 and the multiple transmission filters 121 and 122 are bunched at the selection terminal 151 of the first switch 15. That is, the multiple reception filters 111 to 114 are connected to the selection terminal 151 (the second terminal) of the first switch 15, the common terminal 160 (a fourth terminal) of the second switch 16 is connected to the selection terminal 151 of the first switch 15, and the selection terminal 161 (a fifth terminal) of the second switch 16 is connected to the transmission filter 121. In the second switch 16, the common terminal 160 is connectable to the selection terminal 161.

The selection terminal 161 is connected to the transmission filter 121. The selection terminal 162 is connected to the transmission filter 122. As for the radio frequency circuit 1 according to the first embodiment, the common terminal 160 corresponds to the fourth terminal, and the selection terminal 161 corresponds to the fifth terminal. That is, the second switch 16 includes the fourth terminal (the common terminal 160) and the fifth terminal (the selection terminal 161). In the second switch 16, the fourth terminal is connectable to the fifth terminal. As for the radio frequency circuit 1 according to the first embodiment, the transmission filter 121 is connected to the fifth terminal of the second switch 16.

The second switch 16 changes a connection state between the common terminal 160 and the multiple selection terminals 161 and 162. The second switch 16 is controlled by, for example, the signal processing circuit 2 (see FIG. 2). The second switch 16 electrically connects the common terminal 160 and at least one of the multiple selection terminals 161 or 162 in accordance with the control signal from the RF signal processing circuit 21 (see FIG. 2) of the signal processing circuit 2.

(2.9) Third Switch

The third switch 17 changes a transmission filter that is connected to the power amplifier 14 into a transmission filter selected from the multiple transmission filters 121 and 122. That is, the third switch 17 changes a path that is connected to the power amplifier 14. The third switch 17 includes the common terminal 170 and multiple (two in the illustrated example) selection terminals 171 and 172. The common terminal 170 is connected to the output terminal of the power amplifier 14. The selection terminal 171 is connected to the transmission filter 121. The selection terminal 172 is connected to the transmission filter 122.

The third switch 17 changes a connection state between the common terminal 170 and the multiple selection terminals 171 and 172. The third switch 17 is controlled by, for example, the signal processing circuit 2 (see FIG. 2). The third switch 17 electrically connects the common terminal 170 and at least one of the multiple selection terminals 171 or 172 in accordance with the control signal from the RF signal processing circuit 21 (see FIG. 2) of the signal processing circuit 2.

(2.10) External Connection Terminal

The multiple external connection terminals 4 are electrically connected to the external circuit (for example, the signal processing circuit 2). The multiple external connection terminals 4 include the antenna terminal 41, the signal input terminal (not illustrated), first to fourth signal output terminals (not illustrated), multiple control terminals (not illustrated), and multiple ground terminals (not illustrated).

The antenna 3 is connected to the antenna terminal 41. In the radio frequency circuit 1, the antenna terminal 41 is connected to the first switch 15. The antenna terminal 41 is connected to the multiple reception filters 111 to 114 with the first switch 15 interposed therebetween. The antenna terminal 41 is connected to the multiple transmission filters 121 and 122 with the first switch 15 and the second switch 16 interposed therebetween.

The signal input terminal inputs the transmission signal from the external circuit (for example, the signal processing circuit 2) into the radio frequency circuit 1. In the radio frequency circuit 1, the signal input terminal is connected to the power amplifier 14.

The first to fourth signal output terminals output a reception signal from the radio frequency circuit 1 to the external circuit (for example, the signal processing circuit 2). In the radio frequency circuit 1, the first signal output terminal is connected to the low-noise amplifier 131, the second signal output terminal is connected to the low-noise amplifier 132, the third signal output terminal is connected to the low-noise amplifier 133, and the fourth signal output terminal is connected to the low-noise amplifier 134.

The multiple control terminals input the control signal from the external circuit (for example, the signal processing circuit 2) into the radio frequency circuit 1. In the radio frequency circuit 1, the multiple control terminals are connected to the controller (not illustrated).

The multiple ground terminals are electrically connected to a ground electrode of an external substrate (not illustrated) that is included in the communication device 10, and ground potential is applied thereto. In the radio frequency circuit 1, the multiple ground terminals are connected to a ground layer (not illustrated) of a mounting substrate (not illustrated) described later.

(3) Structure of Radio Frequency Circuit

The structure of the radio frequency circuit 1 according to the first embodiment will now be described with reference to the drawings.

The radio frequency circuit 1 includes the mounting substrate (not illustrated) and multiple electronic components (not illustrated). The radio frequency circuit 1 includes, as multiple electronic components, the multiple reception filters 111 to 114, the multiple transmission filters 121 and 122, the multiple low-noise amplifiers 131 to 134, the power amplifier 14, the first switch 15, the second switch 16, and the third switch 17. The radio frequency circuit 1 further includes, as multiple electronic components, the multiple input matching circuits 181 to 184, and the multiple matching circuits 23, 24, 191, and 192. The radio frequency circuit 1 further includes, as multiple electronic components, the multiple inductors 101 to 103.

The radio frequency circuit 1 is electrically connectable to the external substrate (not illustrated). For example, the external substrate corresponds to a motherboard of the communication device 10 such as a cellular phone or communications equipment. The case where the radio frequency circuit 1 is electrically connectable to the external substrate includes not only the case where the radio frequency circuit 1 is directly mounted on the external substrate but also the case where the radio frequency circuit 1 is indirectly mounted along the external substrate. An example of the case where the radio frequency circuit 1 is indirectly mounted along the external substrate is the case where the radio frequency circuit 1 is mounted on another radio frequency circuit that is mounted on the external substrate.

(3.1) Mounting Substrate

The mounting substrate has a first main surface and a second main surface. The first main surface and the second main surface face each other in the thickness direction of the mounting substrate. The second main surface faces a main surface of the external substrate that faces the mounting substrate with the radio frequency circuit 1 provided on or along the external substrate. An example of the mounting substrate is a single-sided mounting substrate that includes multiple electronic components that are mounted on or along a first main surface. The mounting substrate is not limited to a single-sided mounting substrate but may be a double-sided mounting substrate that includes multiple electronic components that are mounted on or along a first main surface and a second main surface.

The mounting substrate is a multilayer substrate in which multiple dielectric layers are stacked. The mounting substrate includes multiple conductive layers and multiple via conductors (including a through-electrode). The multiple conductive layers include a ground layer that has the ground potential. The multiple via conductors are used for electrically connecting elements (including the electronic components described above) that are mounted on or along the first main surface of the mounting substrate and the conductive layers of the mounting substrate to each other. The multiple via conductors are used for electrically connecting the conductive layers of the mounting substrate and the external connection terminals 4 to each other.

The multiple electronic components are disposed on or along the first main surface of the mounting substrate. The multiple external connection terminals 4 are disposed on or along the second main surface of the mounting substrate.

(3.2) Electronic Component

The multiple electronic components are disposed on or along the first main surface of the mounting substrate. More specifically, the multiple electronic components are mounted on or along the first main surface of the mounting substrate. As for the multiple electronic components, some of the electronic components may be mounted on or along the first main surface of the mounting substrate, and the other electronic components may be contained in the mounting substrate. In short, each of the multiple electronic components is nearer than the second main surface of the mounting substrate to the first main surface and includes at least a portion that is mounted on or along the first main surface.

(3.3) External Connection Terminal

The multiple external connection terminals 4 electrically connect the mounting substrate (not illustrated) and the external substrate (not illustrated) to each other.

The multiple external connection terminals 4 are disposed on or along the second main surface of the mounting substrate. The multiple external connection terminals 4 are pillar-shaped (for example, columnar) electrodes that are provided on or along the second main surface of the mounting substrate. An example of the material of the multiple external connection terminals 4 is metal (for example, copper or copper alloy).

(4) Communication Device

As illustrated in FIG. 2, the communication device 10 includes the radio frequency circuit 1, the signal processing circuit 2, and the antenna 3. The communication device 10 further includes the external substrate (not illustrated) on or along which the radio frequency circuit 1 is mounted. An example of the external substrate is a printed circuit board. The external substrate includes the ground electrode to which the ground potential is applied.

(4.1) Antenna

As illustrated in FIG. 1 and FIG. 2, the antenna 3 is connected to the antenna terminal 41 of the radio frequency circuit 1. The antenna 3 has a function of transmitting a transmission signal that is outputted from the radio frequency circuit 1 such that a radio wave is radiated and a function of receiving a reception signal corresponding to a radio wave from the outside and outputting the reception signal to the radio frequency circuit 1.

(4.2) Signal Processing Circuit

As illustrated in FIG. 2, the signal processing circuit 2 includes the RF signal processing circuit 21 and a baseband signal processing circuit 22. The signal processing circuit 2 processes signals that pass through the radio frequency circuit 1. More specifically, the signal processing circuit 2 processes the transmission signal and the reception signal.

An example of the RF signal processing circuit 21 is a RFIC (Radio Frequency Integrated Circuit). The RF signal processing circuit 21 performs signal processing on a radio frequency signal.

The RF signal processing circuit 21 performs signal processing such as up-converting on a transmission signal that is outputted from the baseband signal processing circuit 22 and outputs the transmission signal on which the signal processing is performed to the radio frequency circuit 1. The RF signal processing circuit 21 performs signal processing such as down-converting on the reception signal that is outputted from the radio frequency circuit 1 and outputs the reception signal on which the signal processing is performed to the baseband signal processing circuit 22.

An example of the baseband signal processing circuit 22 is a BBIC (Baseband Integrated Circuit). The baseband signal processing circuit 22 performs predetermined signal processing on a reception signal from a location outside the signal processing circuit 2. The reception signal that is processed by the baseband signal processing circuit 22 is used, for example, as an image signal for image display or an audio signal for telecommunication.

The RF signal processing circuit 21 also functions as a control unit that controls connections among the first switch 15, the second switch 16, and the third switch 17 that are included in the radio frequency circuit 1, based on radio frequency signals (the transmission signal and the reception signal) that are transmitted or received. Specifically, the RF signal processing circuit 21 switches the connections among the first switch 15, the second switch 16, and the third switch 17 of the radio frequency circuit 1 by using the control signal (not illustrated). The control unit may be provided outside the RF signal processing circuit 21 or may be included in, for example, the radio frequency circuit 1 or the baseband signal processing circuit 22.

(5) Operation of Radio Frequency Circuit

The operation of the radio frequency circuit 1 according to the first embodiment will now be described with reference to FIG. 1.

The case where the matching circuit 24 is not provided between the connection point P1 on the signal path R1 and the common terminal 160 of the second switch 16 is assumed as a comparative example. In this case, a part of the reception signal that is received via the antenna 3 leaks to the signal path T1. As a result, there is a problem in that receiving sensitivity is degraded due to a bunch loss.

However, as illustrated in FIG. 1, the radio frequency circuit 1 according to the first embodiment includes the matching circuit 24 between the connection point P1 on the signal path R1 and the common terminal 160 of the second switch 16. Consequently, the reception band of the impedance of a transmission circuit that has the signal path T1 can be nearly open (that is, the impedance is very high) at the connection point P1. As a result, the reception signal described above is unlikely to leak to the signal path T1, and accordingly, the degradation of the receiving sensitivity due to the bunch loss can be reduced. The "bunch loss" described herein means a loss of the reception signal that is caused in the case where the transmission filters and the reception filters are bunched. In particular, as for the radio frequency circuit 1 according to the first embodiment, the "bunch loss" means a loss of the reception signal in the case where transmission filters are bunched into the reception filters.

(6) Effects

As for the radio frequency circuit 1 according to the first embodiment, in the first switch 15, the common terminal 150 (the first terminal) is connectable to the selection terminal 151 (the second terminal), and in the second switch 16, the common terminal 160 (the fourth terminal) is connectable to the selection terminal 161 (the fifth terminal). The multiple reception filters 111 to 114 are connected to the selection terminal 151 of the first switch 15. The common terminal 150 of the first switch 15 is connected to the antenna terminal 41. The common terminal 160 of the second switch 16 is connected to the selection terminal 151 of the first switch 15. The selection terminal 161 of the second switch 16 is connected to the transmission filter 121. This enables the degradation of the receiving sensitivity due to the bunch loss to be reduced.

More specifically, the radio frequency circuit 1 according to the first embodiment includes the matching circuit 24 that is connected between the selection terminal 151 of the first switch 15 and the common terminal 160 of the second switch 16. This enables the reception band of the impedance of the transmission circuit that has the signal path T1 to be nearly open (that is, the impedance is very high) at the connection point P1. As a result, the reception signal described above is unlikely to leak to the signal path T1, and accordingly, the degradation of the receiving sensitivity due to the bunch loss can be reduced.

In particular, as for the radio frequency circuit 1 according to the first embodiment, all of the multiple reception filters 111 to 114 are connected to the first switch 15 (the selection terminal 151 thereof) at a front position, and the reception filters are not connected to the second switch 16 at a subsequent position. As for the radio frequency circuit 1 according to the first embodiment, the multiple transmission filters 121 and 122 are connected to the second switch 16 (the selection terminals 161 and 162 thereof) at the subsequent position. This enables the degradation of the receiving sensitivity due to the bunch loss to be reduced regarding all of the multiple reception filters 111 to 114.

As for the radio frequency circuit 1 according to the first embodiment, as illustrated in FIG. 1, the multiple transmission filters 121 and 122 are connected to the selection terminal 151 of the first switch 15 with the second switch 16 interposed therebetween. This enables the off capacitance of the first switch 15 to be reduced unlike the case where the multiple transmission filters 121 and 122 are directly connected to the first switch 15. As a result, the bunch loss of the first switch 15 can be reduced. In addition, intermodulation distortion (IMD) between the multiple transmission filters 121 and 122 can be reduced unlike the case where the multiple transmission filters 121 and 122 are directly connected to the first switch 15.

(7) Modification

Modifications to the first embodiment are listed below.

According to the first embodiment, the matching circuit 24 is provided between the selection terminal 151 of the first switch 15 and the common terminal 160 of the second switch 16. However, the matching circuit 24 may be omitted. In this case, the common terminal 160 of the second switch 16 is not connected to the selection terminals 161 and 162, and consequently, the reception band of the impedance of the transmission circuit that has the signal path T1 can be nearly open (that is, the impedance is very high) at the connection point P1. As a result, the reception signal described above is unlikely to leak to the signal path T1, and accordingly, the degradation of the receiving sensitivity due to the bunch loss can be reduced.

According to the first embodiment, as illustrated in FIG. 3A, the matching circuit 24 includes the inductor 241. As illustrated in FIG. 3B, the matching circuit 24 may include a capacitor 242. The matching circuit 24 may include both of the inductor 241 and the capacitor 242. In short, the matching circuit 24 may include at least the inductor 241 or the capacitor 242.

Second Embodiment

A radio frequency circuit 1A according to the second embodiment will be described with reference to FIG. 4 to FIG. 5B. Components of the radio frequency circuit 1A according to the second embodiment like to those of the radio frequency circuit 1 according to the first embodiment (see FIG. 1) are designated by using like reference signs, and the description thereof is omitted.

Figure 4:
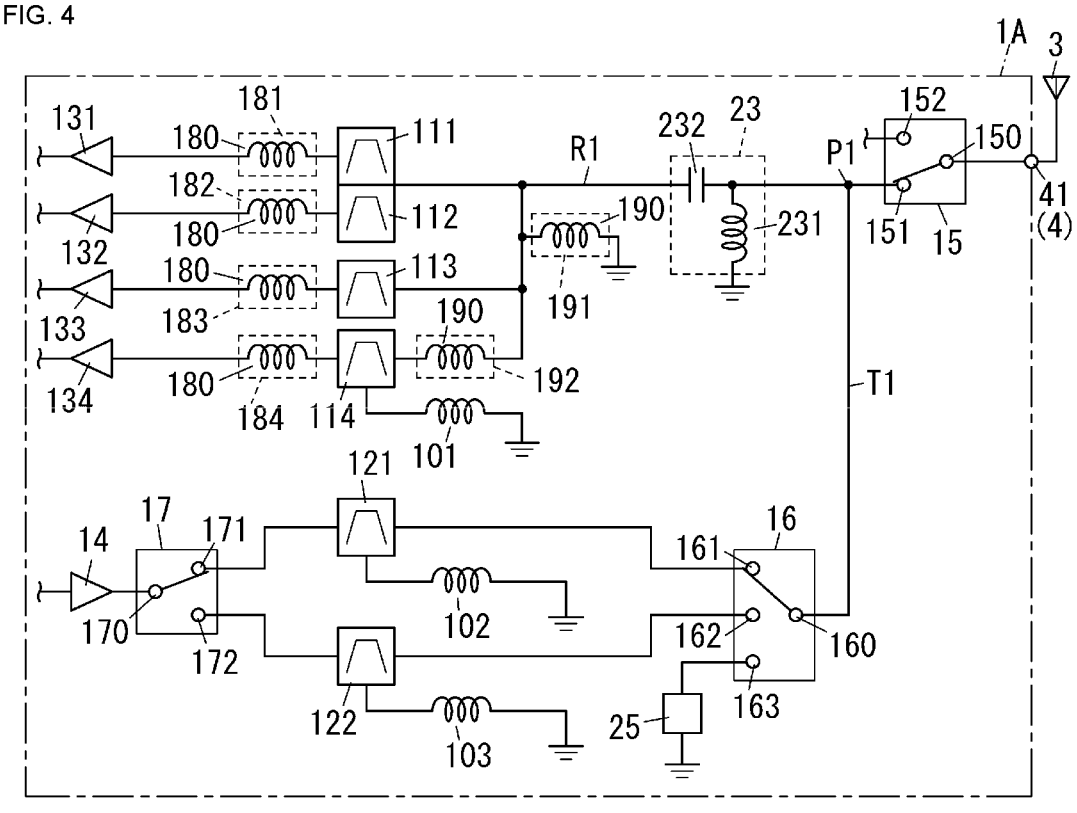
FIG. 4 schematically illustrates a radio frequency circuit according to a second embodiment.

As illustrated in FIG. 4, the radio frequency circuit 1A according to the second embodiment differs from the radio frequency circuit 1 according to the first embodiment (see FIG. 1) in that the second switch 16 further includes a selection terminal 163. In addition, the radio frequency circuit 1A according to the second embodiment differs from the radio frequency circuit 1 according to the first embodiment in including a matching circuit 25 that is connected between the selection terminal 163 of the second switch 16 and the ground instead of the matching circuit 24.

As for the radio frequency circuit 1A according to the second embodiment, as illustrated in FIG. 4, the second switch 16 includes the common terminal 160 and multiple (three in an illustrated example) selection terminal 161 to 163. The common terminal 160 is connected to the selection terminal 151 of the first switch 15. The selection terminal 161 is connected to the transmission filter 121. The selection terminal 162 is connected to the transmission filter 122. The selection terminal 163 is connected to the matching circuit 25. As for the radio frequency circuit 1A according to the second embodiment, the common terminal 160 corresponds to the fourth terminal, the selection terminal 161 corresponds to the fifth terminal, and the selection terminal 163 corresponds to a sixth terminal. That is, the second switch 16 further includes the sixth terminal. In the second switch 16, the fourth terminal (the common terminal 160) is connectable to at least the fifth terminal (the selection terminal 161) or the sixth terminal (the selection terminal 163).

As illustrated in FIG. 4, the matching circuit 25 is provided between the selection terminal 163 of the second switch 16 and the ground. That is, the radio frequency circuit 1A according to the second embodiment further includes the matching circuit 25 that is connected between the sixth terminal (the selection terminal 163) of the second switch 16 and the ground. As illustrated in FIG. 5A, the matching circuit 25 includes an inductor 251. The inductor 251 of the matching circuit 25 is connected between the selection terminal 163 of the second switch 16 and the ground.

As for the radio frequency circuit 1A according to the second embodiment, for example, in the case where the reception signal is received, and the transmission signal is not transmitted, the common terminal 160 (the fourth terminal) of the second switch 16 is connected to the selection terminal 163 (the sixth terminal). This enables the reception band of the impedance of the transmission circuit that has the signal path T1 to be nearly open (that is, the impedance is very high) at the connection point P1. As a result, the reception signal described above is unlikely to leak to the signal path T1, and accordingly, the degradation of the receiving sensitivity due to the bunch loss can be reduced.

Figures 5A, 5B:
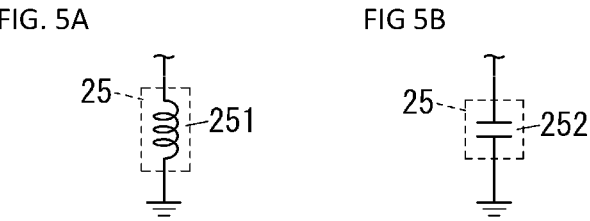
FIG. 5A and FIG. 5B illustrate circuit diagrams of specific example of a matching circuit that is used for the radio frequency circuit.

According to the second embodiment, as illustrated in FIG. 5A, the matching circuit 25 includes the inductor 251. As illustrated in FIG. 5B, the matching circuit 25 may include a capacitor 252. The matching circuit 25 may include both of the inductor 251 and the capacitor 252. In short, the matching circuit 25 may include at least the inductor 251 or the capacitor 252.

Figure 6:
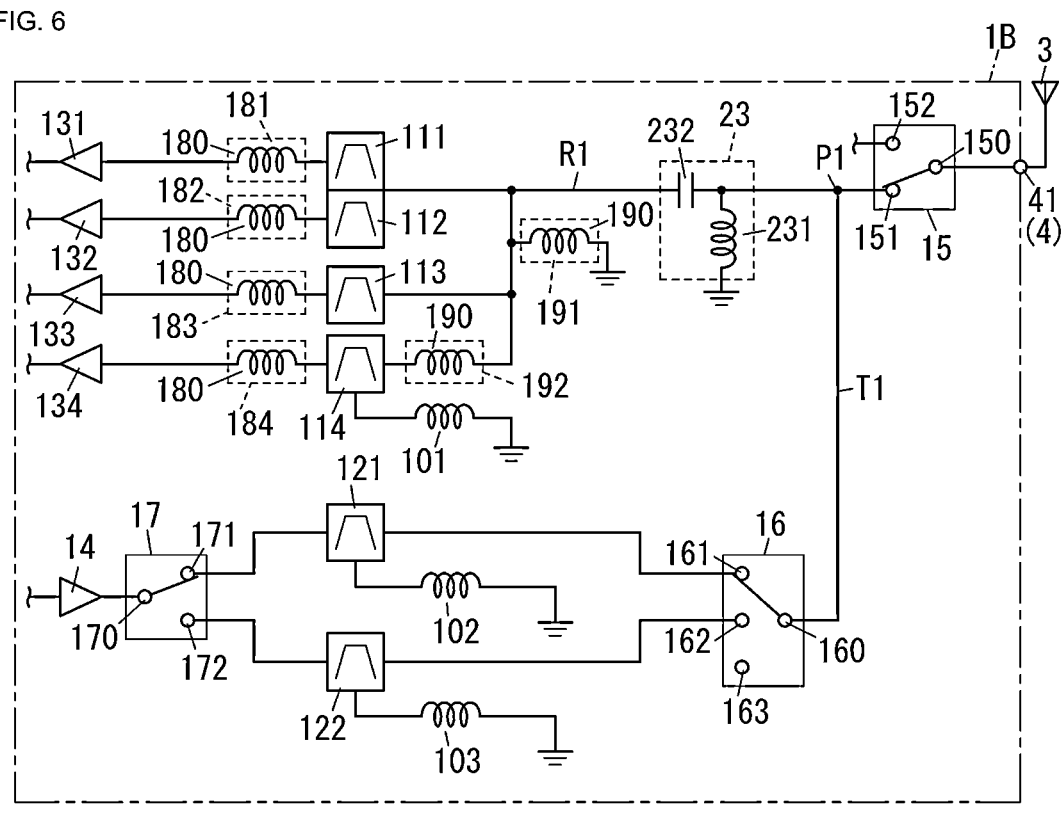
FIG. 6 schematically illustrates a radio frequency circuit according to a modification to the second embodiment.

According to the second embodiment, as illustrated in FIG. 4, the matching circuit 25 is provided between the selection terminal 163 of the second switch 16 and the ground. However, the matching circuit 25 may be omitted. In this case, as illustrated in FIG. 6, the selection terminal 163 of the second switch 16 is preferably connected to no circuit in a radio frequency circuit 1B. This enables the reception band of the impedance of the transmission circuit that has the signal path T1 to be nearly open (that is, the impedance is very high) at the connection point P1. As a result, the reception signal described above is unlikely to leak to the signal path T1, and accordingly, the degradation of the receiving sensitivity due to the bunch loss can be reduced.

Third Embodiment

A radio frequency circuit 1C according to the third embodiment will be described with reference to FIG. 7. Components of the radio frequency circuit 1C according to the third embodiment like to those of the radio frequency circuit 1A according to the second embodiment (see FIG. 4) are designated by using like reference signs, and the description thereof is omitted.

Figure 7:
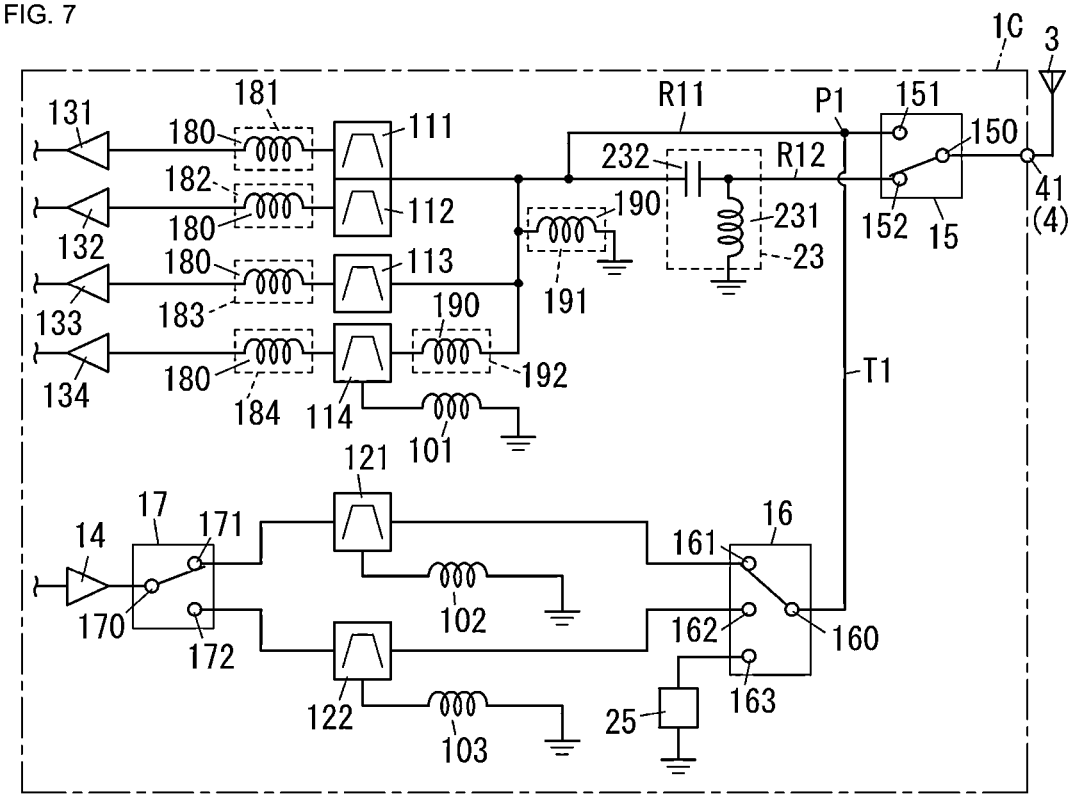
FIG. 7 schematically illustrates a radio frequency circuit according to a third embodiment.

As illustrated in FIG. 7, the radio frequency circuit 1C according to the third embodiment differs from the radio frequency circuit 1A according to the second embodiment (see FIG. 4) in that the multiple reception filters 111 to 114 are connected to both of the selection terminals 151 and 152 of the first switch 15.

As for the radio frequency circuit 1C according to the third embodiment, as illustrated in FIG. 7, the first switch 15 includes the common terminal 150 and the multiple (two in an illustrated example) selection terminals 151 and 152. The common terminal 150 is connected to the antenna terminal 41. The selection terminal 151 is connected to the multiple reception filters 111 to 114. The selection terminal 152 is connected to the multiple reception filters 111 to 114 with the matching circuit 23 interposed therebetween. That is, as for the radio frequency circuit 1C according to the third embodiment, the multiple reception filters 111 to 114 are connected to both of the selection terminals 151 and 152 of the first switch 15.

As for the radio frequency circuit 1C according to the third embodiment, the matching circuit 23 is connected between the multiple reception filters 111 to 114 and the selection terminal 152 of the first switch 15. However, the matching circuit 23 is not connected between the multiple reception filters 111 to 114 and the selection terminal 151 of the first switch 15. That is, the radio frequency circuit 1C according to the third embodiment further includes the matching circuit 23 that is not connected between the multiple reception filters 111 to 114 and the selection terminal 151 of the first switch 15 but that is connected between the multiple reception filters 111 to 114 and the selection terminal 152 of the first switch 15. As for the radio frequency circuit 1C according to the third embodiment, the selection terminal 151 of the first switch 15 corresponds to the second terminal, and the selection terminal 152 of the first switch 15 corresponds to the third terminal.

As for the radio frequency circuit 1C according to the third embodiment, the signal path T1 that connects the selection terminal 151 of the first switch 15 and the common terminal 160 of the second switch 16 to each other is connected to a signal path R11 that connects the multiple reception filters 111 to 114 and the selection terminal 151 of the first switch 15 to each other at the connection point P1 on the signal path R11. The signal path T1 is not connected to a signal path R12 that connects the multiple reception filters 111 to 114 and the selection terminal 152 of the first switch 15 to each other.

As for the radio frequency circuit 1C according to the third embodiment, in the case where the reception signal is received, and the transmission signal is transmitted, the common terminal 150 of the first switch 15 is connected to the selection terminal 151, and the signal path R11 is selected. As for the radio frequency circuit 1C, in the case where the reception signal is received, and the transmission signal is not transmitted, the common terminal 150 of the first switch 15 is connected to the selection terminal 152, and the signal path R12 is selected. As for the radio frequency circuit 1C according to the third embodiment, the signal paths are thus switched in the case where only the reception signal is received and in the case where the reception signal is received, and the transmission signal is transmitted.

In the case where the reception signal is received, and the transmission signal is not transmitted, the common terminal 160 of the second switch 16 is preferably connected to the selection terminal 163. In this case, the matching circuit 25 is connected to the signal path T1, and accordingly, the reception band of the impedance of the transmission circuit that has the signal path T1 can be nearly open (that is, the impedance is very high) at the connection point P1. As a result, the reception signal described above is unlikely to leak to the signal path T1, and accordingly, the degradation of the receiving sensitivity due to the bunch loss can be reduced.

Fourth Embodiment

A radio frequency circuit 1D according to the fourth embodiment will be described with reference to FIG. 8.

Components of the radio frequency circuit 1D according to the fourth embodiment like to those of the radio frequency circuit 1C according to the third embodiment (see FIG. 7) are designated by using like reference signs, and the description thereof is omitted.

The radio frequency circuit 1D according to the fourth embodiment differs from the radio frequency circuit 1C according to the third embodiment (see FIG. 7) in that a transmission filter 123 is further included. In addition, the radio frequency circuit 1D according to the fourth embodiment differs from the radio frequency circuit 1C according to the third embodiment in that the first switch 15 further includes a selection terminal 153.

Figure 8:
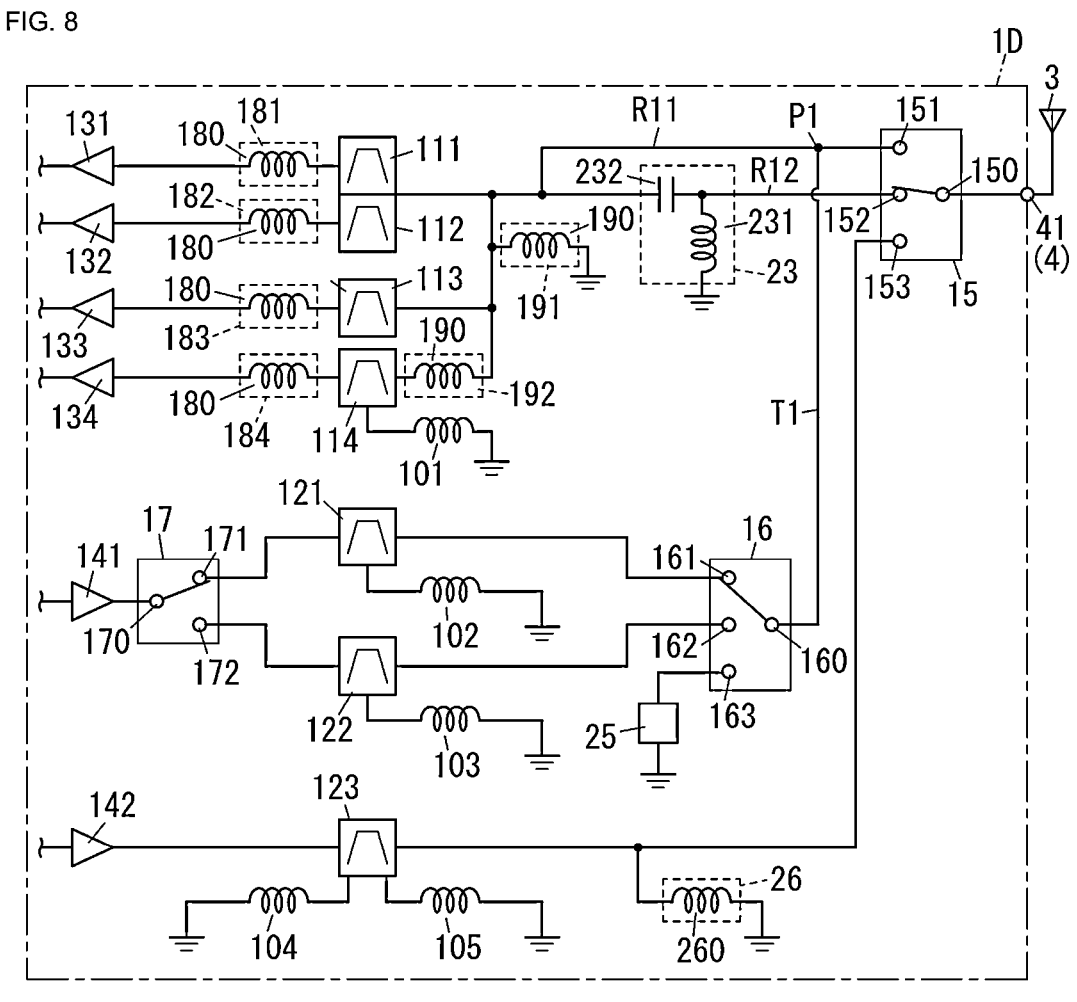
FIG. 8 schematically illustrates a radio frequency circuit according to a fourth embodiment.

As for the radio frequency circuit 1D according to the fourth embodiment, as illustrated in FIG. 8, the first switch 15 includes the common terminal 150 and multiple (three in an illustrated example) selection terminals 151 to 153. The common terminal 150 is connected to the antenna terminal 41. The selection terminal 151 is connected to the multiple reception filters 111 to 114. The selection terminal 152 is connected to the multiple reception filters 111 to 114 with the matching circuit 23 interposed therebetween. The selection terminal 153 is directly connected to the transmission filter 123 without interposing the second switch 16 therebetween.

As for the radio frequency circuit 1D according to the fourth embodiment, the common terminal 150 corresponds to the first terminal, the selection terminal 151 corresponds to the second terminal, the selection terminal 152 corresponds to the third selection terminal, and the selection terminal 153 corresponds to a bypass terminal. That is, the first switch 15 further includes the selection terminal 153 (the bypass terminal) to which the transmission filter 123 is connected without interposing the second switch 16 therebetween. In the first switch 15, the first terminal (the common terminal 150) is connectable to at least the second terminal (selection terminal 151), the third terminal (the selection terminal 152), or the bypass terminal (the selection terminal 153).

As for the radio frequency circuit 1D according to the fourth embodiment, the transmission filter 121 corresponds to a first transmission filter, and the transmission filter 123 corresponds to a second transmission filter. That is, the radio frequency circuit 1D according to the fourth embodiment further includes the second transmission filter (the transmission filter 123) that differs from the first transmission filter (the transmission filter 121) that serves as a transmission filter.

The transmission filter 123 allows a transmission signal in a communication band that differs from those for the transmission filters 121 and 122 to pass therethrough. More specifically, the transmission filter 123 allows a transmission signal in a sixth communication band to pass therethrough. An example of the sixth communication band is Band41 of the 3GPP LTE standard, and the transmission band of the sixth communication band is 2496 MHz to 2690 MHz. The transmission filter 123 is provided between a power amplifier 142 and the first switch 15. The transmission filter 123 allows a radio frequency signal that is amplified by the power amplifier 142 to pass therethrough.

As for the radio frequency circuit 1D according to the fourth embodiment, as illustrated in FIG. 8, an inductor 104 is connected between a first parallel arm resonator (not illustrated) among multiple parallel arm resonators (not illustrated) that are included in the transmission filter 123 and the ground, and an inductor 105 is connected between a second parallel arm resonator (not illustrated) and the ground. Consequently, the attenuation pole of the transmission filter 123 is adjusted.

As for the radio frequency circuit 1D according to the fourth embodiment, as illustrated in FIG. 8, a matching circuit 26 is provided between the transmission filter 123 and the selection terminal 153 of the first switch 15. The matching circuit 26 is a circuit for impedance matching between the transmission filter 123 and the first switch 15. As illustrated in FIG. 8, the matching circuit 26 includes an inductor 260. The matching circuit 26 is not limited to a structure that includes the single inductor 260 but may have, for example, a structure that includes multiple inductors or a structure that includes multiple inductors and multiple capacitors.

As for the radio frequency circuit 1D according to the fourth embodiment, the transmission filter 123 is connected to the selection terminal 153 of the first switch 15 without interposing the second switch 16 therebetween. For this reason, a loss can be reduced unlike the case where all of the transmission filters 121 to 123 are connected to the first switch 15 with the second switch 16 interposed therebetween.

Fifth Embodiment

A radio frequency circuit 1E according to the fifth embodiment will be described with reference to FIG. 9 to FIG. 10C. Components of the radio frequency circuit 1E according to the fifth embodiment like to those of the radio frequency circuit 1D according to the fourth embodiment (see FIG. 8) are designated by using like reference signs, and the description thereof is omitted.

The radio frequency circuit 1E according to the fifth embodiment differs from the radio frequency circuit 1D according to the fourth embodiment (see FIG. 8) in that multiple reception filters 115 to 117 are further included. In addition, the radio frequency circuit 1E according to the fifth embodiment differs from the radio frequency circuit 1D according to the fourth embodiment in that multiple transmission filters 124 and 125 are further included. In addition, the radio frequency circuit 1E according to the fifth embodiment differs from the radio frequency circuit 1D according to the fourth embodiment in that multiple (two in an illustrated example) phase circuits (a first phase circuit 281 and a second phase circuit 282) are further included In addition, the radio frequency circuit 1E according to the fifth embodiment differs from the radio frequency circuit 1D according to the fourth embodiment in that the first switch 15 includes selection terminals 151A and 151B that serve as the second terminal, and selection terminals 152A and 152B that serve as the third terminal. In addition, the radio frequency circuit 1E according to the fifth embodiment differs from the radio frequency circuit 1D according to the fourth embodiment in including two second switches 16A and 16B.

Figure 9:
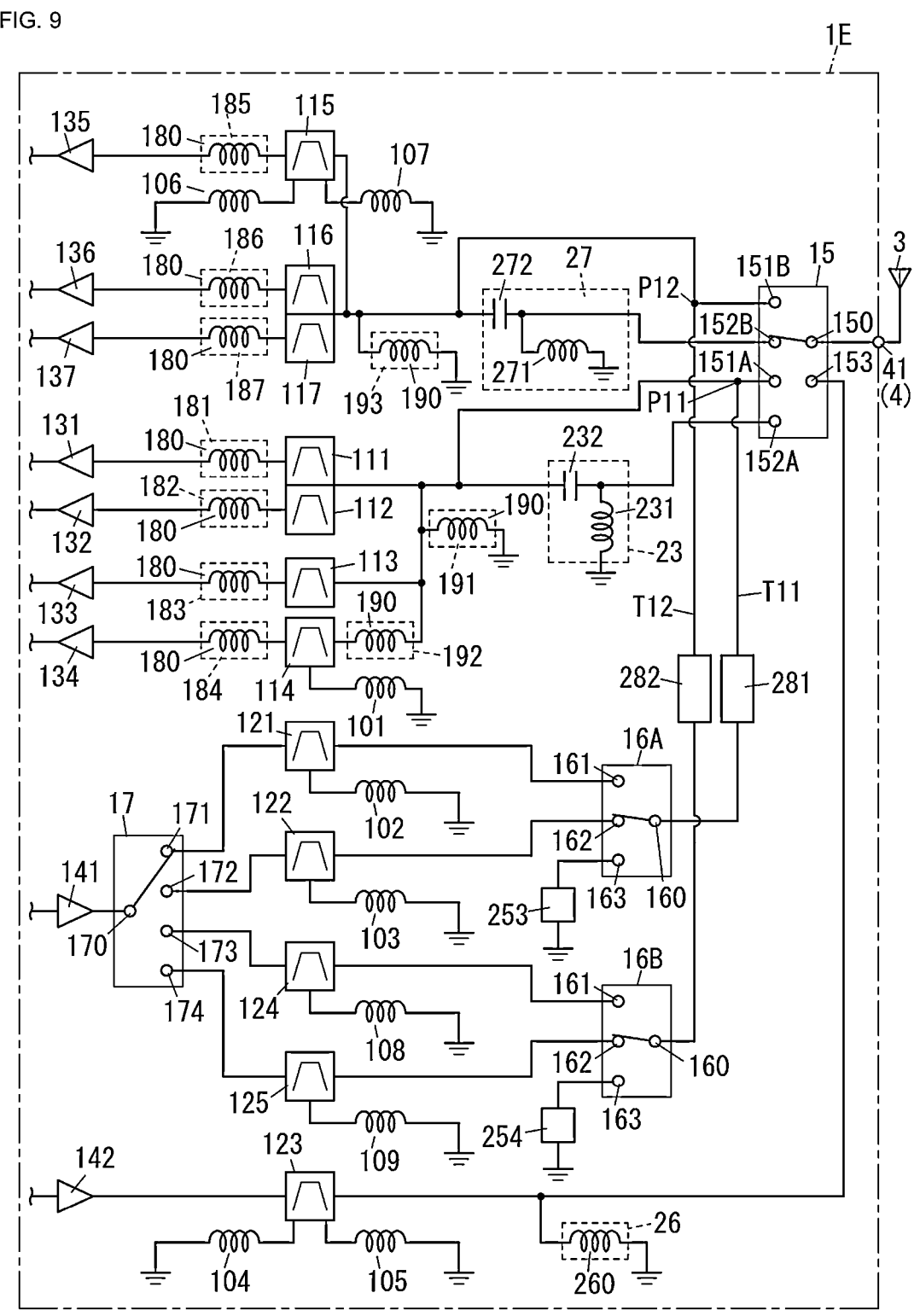
FIG. 9 schematically illustrates a radio frequency circuit according to a fifth embodiment.
Figure 10:
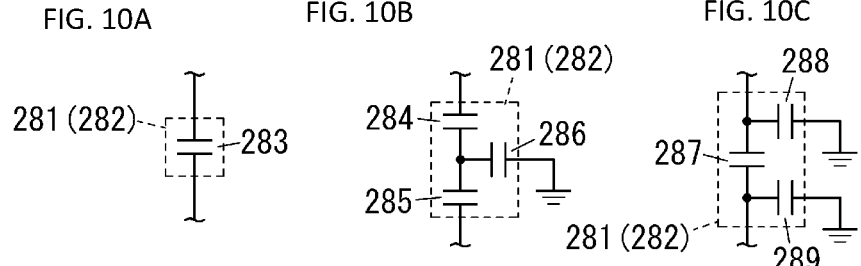
FIG. 10A to FIG. 10C illustrate circuit diagrams of specific examples of a phase circuit that is used for the radio frequency circuit.

As illustrated in FIG. 9, the radio frequency circuit 1E according to the fifth embodiment includes multiple (seven in the illustrated example) reception filters 111 to 117, multiple (five in the illustrated example) transmission filters 121 to 125, multiple (seven in the illustrated example) low-noise amplifiers 131 to 137, and multiple (two in the illustrated example) power amplifiers 141 and 142. The radio frequency circuit 1E according to the fifth embodiment further includes the first switch 15, the multiple (two in the illustrated example) second switches 16A and 16B, the third switch 17, multiple (seven in the illustrated example) input matching circuits 181 to 187, multiple (eight in the illustrated example) matching circuits 23, 26, 27, 191 to 193, 253, and 254, and the multiple (two in the illustrated example) phase circuits (the first phase circuit 281 and the second phase circuit 282). The radio frequency circuit 1E according to the fifth embodiment further includes multiple (nine in the illustrated example) inductors 101 to 109. The radio frequency circuit 1E according to the fifth embodiment further includes the external connection terminals 4.

As illustrated in FIG. 9, the first switch 15 includes the common terminal 150 and the multiple (five in the illustrated example) selection terminals 151A, 151B, 152A, 152B, and 153. The common terminal 150 is connected to the antenna terminal 41. The selection terminal 151A is connected to the multiple reception filters 111 to 114. The selection terminal 152A is connected to the multiple reception filters 111 to 114 with the matching circuit 23 interposed therebetween. The selection terminal 151B is connected to the multiple reception filters 115 to 117. The selection terminal 152B is connected to the multiple reception filters 115 to 117 with the matching circuit 27 interposed therebetween. The selection terminal 153 is connected to the transmission filter 123.

As for the radio frequency circuit 1E according to the fifth embodiment, the selection terminal 151A corresponds to a first specific terminal, the selection terminal 151B corresponds to a second specific terminal, the selection terminal 152A corresponds to a third specific terminal, and the selection terminal 152B corresponds to a fourth specific terminal. As for the radio frequency circuit 1E according to the fifth embodiment, the selection terminal 153 corresponds to the bypass terminal. That is, the first switch 15 includes the first specific terminal (the selection terminal 151A) and the second specific terminal (the selection terminal 151B) that serve as the second terminal and the third specific terminal (the selection terminal 152A) and the fourth specific terminal (the selection terminal 152B) that serve as the third terminal.

As for the radio frequency circuit 1E according to the fifth embodiment, the multiple reception filters 111 to 114 correspond to multiple first reception filters, and the multiple reception filters 115 to 117 correspond to multiple second reception filters. That is, the radio frequency circuit 1E according to the fifth embodiment further includes the multiple second reception filters (the reception filters 115 to 117) that differ from the multiple first reception filters (the reception filters 111 to 114) that serve as multiple reception filters.

The multiple reception filters 115 to 117 allow reception signals in communication bands that differ from those for the multiple reception filters 111 to 114 to pass therethrough. More specifically, the reception filter 115 allows a reception signal in a seventh communication band to pass therethrough. The reception filter 116 allows a reception signal in the fifth communication band to pass therethrough. The reception filter 117 allows a reception signal in an eighth communication band to pass therethrough.

The fifth communication band is the Band66 of the 3GPP LTE standard as described above, and the reception band of the fifth communication band is 2110 MHz to 2200 MHz. An example of the seventh communication band is Band25 of the 3GPP LTE standard, and the reception band of the seventh communication band is 1930 MHz to 1995 MHz. An example of the eighth communication band is Band30 of the 3GPP LTE standard, and the reception band of the eighth communication band is 2350 MHz to 2360 MHz.

The reception filter 115 is provided between the low-noise amplifier 135 and the first switch 15. The reception filter 116 is provided between the low-noise amplifier 136 and the first switch 15. The reception filter 117 is provided between the low-noise amplifier 137 and the first switch 15. The multiple reception filters 115 to 117 allow the reception signals in the reception bands of the respective communication bands among the radio frequency signals that are inputted from the antenna terminal 41 to pass therethrough.

As for the radio frequency circuit 1E according to the fifth embodiment, as illustrated in FIG. 9, the inductor 106 is connected between a first parallel arm resonator among multiple parallel arm resonators that are included in the reception filter 115 and the ground, and the inductor 107 is connected between a second parallel arm resonator and the ground. Consequently, the attenuation pole of the reception filter 115 is adjusted.

The multiple transmission filters 124 and 125 allow transmission signals in communication bands that differ from those for the multiple transmission filters 121 to 123 to pass therethrough. More specifically, the transmission filter 124 allows a transmission signal in the seventh communication band to pass therethrough. The transmission filter 125 allows the transmission signal in the fifth communication band to pass therethrough.

The fifth communication band is the Band66 of the 3GPP LTE standard as described above, and the transmission band of the fifth communication band is 1710 MHz to 1780 MHz. The seventh communication band is the Band25 of the 3GPP LTE standard as described above, and the transmission band of the seventh communication band is 1850 MHz to 1915 MHz.

The transmission filter 121 is provided between the selection terminal 161 of the second switch 16A and the selection terminal 171 of the third switch 17. The transmission filter 122 is provided between the selection terminal 162 of the second switch 16A and the selection terminal 172 of the third switch 17. The transmission filter 124 is provided between the selection terminal 161 of the second switch 16B and a selection terminal 173 of the third switch 17. The transmission filter 125 is provided between the selection terminal 162 of the second switch 16B and the selection terminal 174 of the third switch 17. The matching circuit 253 is connected to the selection terminal 163 of the second switch 16A. The matching circuit 254 is connected to the selection terminal 163 of the second switch 16B. The matching circuits 253 and 254 are the same as the matching circuit 25 described above, and the description thereof is omitted.

As for the radio frequency circuit 1E according to the fifth embodiment, as illustrated in FIG. 9, the inductor 108 is connected between parallel arm resonators that are included in the transmission filter 124 and the ground. The inductor 109 is connected between parallel arm resonators that are included in the transmission filter 125 and the ground. Consequently, the attenuation pole of the multiple transmission filters 124 and 125 is adjusted.

As for the radio frequency circuit 1E according to the fifth embodiment, the first phase circuit 281 is provided between the selection terminal 151A of the first switch 15 and the common terminal 160 of the second switch 16A. As for the radio frequency circuit 1E according to the fifth embodiment, the second phase circuit 282 is provided between the selection terminal 151B of the first switch 15 and the common terminal 160 of the second switch 16B.

As illustrated in FIG. 10A, the first phase circuit 281 and the second phase circuit 282 include respective capacitors 283. The capacitor 283 of the first phase circuit 281 is connected between the selection terminal 151A of the first switch 15 and the common terminal 160 of the second switch 16A. The capacitor 283 of the second phase circuit 282 is connected between the selection terminal 151B of the first switch 15 and the common terminal 160 of the second switch 16B.

The radio frequency circuit 1E according to the fifth embodiment includes the first phase circuit 281, and accordingly, the reception band of the impedance of the transmission circuit that has the signal path T1 can be nearly open (that is, the impedance is very high) at the connection point P1 even in the case where the common terminal 160 of the second switch 16A is not connected to the selection terminal 163. As a result, the reception signal described above is unlikely to leak to the signal path T11, and accordingly, the degradation of the receiving sensitivity due to the bunch loss can be reduced. The signal path T11 connects the selection terminal 151A of the first switch 15 and the common terminal 160 of the second switch 16A to each other.

The radio frequency circuit 1E according to the fifth embodiment includes the second phase circuit 282, and accordingly, the impedance of the signal path T12 in the frequency band of the reception band of the reception signal that is received via the antenna 3 can be very high even in the case where the common terminal 160 of the second switch 16B is not connected to the selection terminal 163. As a result, the reception signal described above is unlikely to leak to the signal path T12, and accordingly, the degradation of the receiving sensitivity due to the bunch loss can be reduced. The signal path T12 connects the selection terminal 151B of the first switch 15 and the common terminal 160 of the second switch 16B to each other.

According to the fifth embodiment, as illustrated in FIG. 10A, the first phase circuit 281 and the second phase circuit 282 include the respective capacitors 283. However, as illustrated in FIG. 10B, the first phase circuit 281 and the second phase circuit 282 may include multiple capacitors 284 to 286. In FIG. 10B, as for the first phase circuit 281 and the second phase circuit 282, the capacitors 284 and 285 are connected to each other in series and is connected between the selection terminal 151A of the first switch 15 and the common terminal 160 of the second switch 16A. As for the first phase circuit 281 and the second phase circuit 282, the capacitor 286 is connected between a connection point between the capacitors 284 and 285 and the ground.

As illustrated in FIG. 10C, the first phase circuit 281 and the second phase circuit 282 may include multiple capacitors 287 to 289. In FIG. 10C, as for the first phase circuit 281 and the second phase circuit 282, the capacitor 287 is connected between the selection terminal 151A of the first switch 15 and the common terminal 160 of the second switch 16A. As for the first phase circuit 281 and the second phase circuit 282, the capacitor 288 is connected between an end of the capacitor 287 and the ground. The capacitor 289 is connected between the other end of the capacitor 287 and the ground. For example, the first phase circuit 281 and the second phase circuit 282 may include respective inductors or may include both of respective capacitors and respective inductors.

Sixth Embodiment

A radio frequency circuit 1F according to the sixth embodiment will be described with reference to FIG. 11. Components of the radio frequency circuit 1F according to the sixth embodiment like to those of the radio frequency circuit 1E according to the fifth embodiment (see FIG. 9) are designated by using like reference signs, and the description thereof is omitted.

The radio frequency circuit 1F according to the sixth embodiment differs from the radio frequency circuit 1E according to the fifth embodiment (see FIG. 9) in that the two second switches 16A and 16B described according to the fifth embodiment correspond to the single second switch 16.

Figure 11:
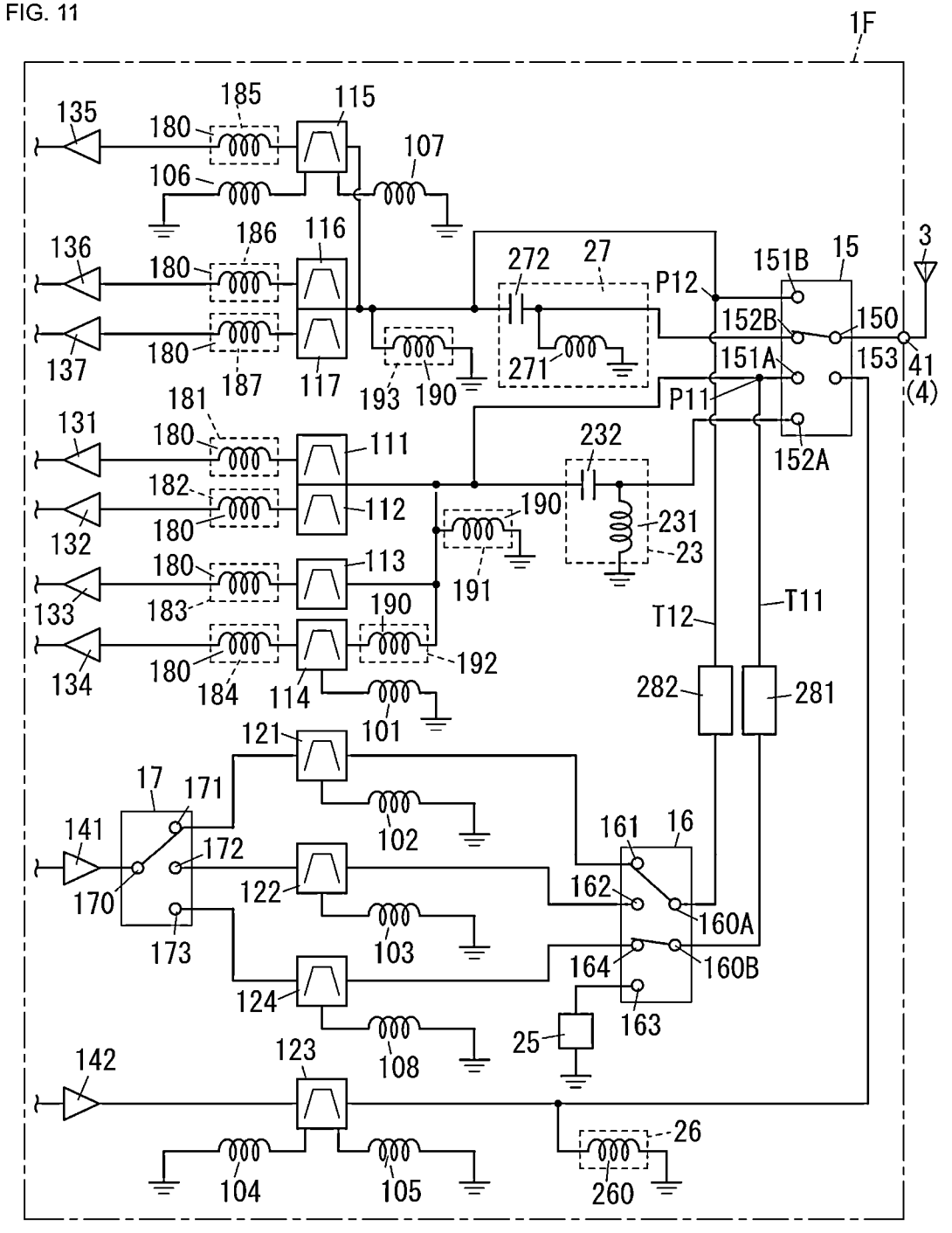
FIG. 11 schematically illustrates a radio frequency circuit according to a sixth embodiment.

As for the radio frequency circuit 1F according to the sixth embodiment, as illustrated in FIG. 11, the second switch 16 includes multiple (two in an illustrated example) common terminals 160A and 160B and multiple (four in the illustrated example) selection terminals 161 to 164. The common terminal 160B of the second switch 16 is connected to the selection terminal 151A of the first switch 15 with the first phase circuit 281 interposed therebetween. The common terminal 160A of the second switch 16 is connected to the selection terminal 151B of the first switch 15 with the second phase circuit 282 interposed therebetween.

As for the radio frequency circuit 1F according to the sixth embodiment, the selection terminal 151A of the first switch 15 corresponds to the first specific terminal, the selection terminal 151B of the first switch 15 corresponds to the second specific terminal, the common terminal 160B of the second switch 16 corresponds to a fifth specific terminal, and the common terminal 160A of the second switch 16 corresponds to a sixth specific terminal. That is, the fifth specific terminal (the common terminal 160B) of the second switch 16 is connected to the first specific terminal (the selection terminal 151A) of the first switch 15. The sixth specific terminal (the common terminal 160A) of the second switch 16 is connected to the second specific terminal (the selection terminal 151B) of the first switch 15.

As for the radio frequency circuit 1F according to the sixth embodiment, the transmission filter 121 allows the transmission signal in the second communication band and the transmission signal in the fifth communication band to pass therethrough as described above. Accordingly, the second switch 16 connects both of the common terminals 160A and 160B to the selection terminal 161 and consequently enables the transmission signal in the second communication band and the transmission signal in the fifth communication band to be separately transmitted via different signal paths. In this case, for example, the first phase circuit 281 greatly increases the impedance of the signal path T11 in the frequency band of the fifth communication band, and consequently, only the transmission signal in the second communication band is allowed to pass therethrough. For example, the second phase circuit 282 greatly increases the impedance of the signal path T12 in the frequency band of the second communication band, and consequently, only the transmission signal in the fifth communication band is allowed to pass therethrough. This enables the size of the radio frequency circuit 1F to be reduced unlike the case where transmission filters that allow transmission signals in two communication bands to pass therethrough are separately provided.

In the present specification, the case where the "first filter and the second filter are bunched" includes the case where the first filter and the second filter are directly connected to each other and the case where the first filter and the second filter are connected to the same switch. An example of the first filter is the reception filter. An example of the second filter is the reception filter or the transmission filter.

In the present specification, the "bunch loss of the reception signal" includes a loss of the reception signal that leaks from a first signal path to a second signal path in the case where the first signal path and the second signal path are directly connected to each other and the sum of a loss of the reception signal that leaks from the first signal path to the second signal path in the case where the first signal path and the second signal path are connected to the same switch and the off capacitance of the switch. The first signal path is a reception path for the reception signal described above. The second signal path is a transmission path or a reception path to which the reception signal described above leaks.

In the present specification, the case where an "element is disposed on or along a first main surface of a substrate" includes not only the case where the element is directly mounted on the first main surface of the substrate but also the case where the element is disposed in a space facing the first main surface, of the space facing the first main surface and a space facing a second main surface that are divided by the substrate. That is, the case where the "element is disposed on or along the first main surface of the substrate" includes the case where the element is mounted along the first main surface of the substrate with another circuit element or an electrode, for example, interposed therebetween.

In the present specification, the case where the "element is disposed on or along the second main surface of the substrate" includes not only the case where the element is directly mounted on the second main surface of the substrate but also the case where the element is disposed in the space facing the second main surface, of the space facing the first main surface and the space facing the second main surface that are divided by the substrate. That is, the case where the "element is disposed on or along the second main surface of the substrate" includes the case where the element is mounted along the second main surface of the substrate with another circuit element or an electrode, for example, interposed therebetween.

In the present specification, the phrase "A and B are simultaneously connectable to C" means that the A and B are simultaneously connected to the C in some cases. For example, the A corresponds to the common terminal 160A of the second switch 16, the B corresponds to the common terminal 160B of the second switch 16, and the C corresponds to the selection terminal 161 of the second switch 16, but this is not a limitation.

Aspects

The present specification discloses aspects described below.

A radio frequency circuit (1; 1A to 1F) according to a first aspect includes an antenna terminal (41), a transmission filter (121), multiple reception filters (111 to 114), a first switch (15), and a second switch (16; 16A, 16B). The first switch (15) includes a first terminal (150), a second terminal (151), and a third terminal (152). The second switch (16; 16A, 16B) includes a fourth terminal (160; 160A, 160B) and a fifth terminal (161). In the first switch (15), the first terminal (150) is connectable to the second terminal (151) or the third terminal (152). In the second switch (16; 16A, 16B), the fourth terminal (160; 160A, 160B) is connectable to the fifth terminal (161). The multiple reception filters (111 to 114) are connected to the second terminal (151) or the third terminal (152) of the first switch (15). The first terminal (150) of the first switch (15) is connected to the antenna terminal (41). The fourth terminal (160; 160A, 160B) of the second switch (16; 16A, 16B) is connected to the second terminal (151) of the first switch (15). The fifth terminal (161) of the second switch (16; 16A, 16B) is connected to the transmission filter (121).

According to this aspect, the degradation of the receiving sensitivity due to the bunch loss can be reduced.

A radio frequency circuit (1) according to a second aspect further includes a matching circuit (24) in the first aspect. The matching circuit (24) is connected between the second terminal (151) of the first switch (15) and the fourth terminal (160) of the second switch (16).

According to this aspect, the degradation of the receiving sensitivity due to the bunch loss can be reduced.

As for a radio frequency circuit (1A; 1C to 1F) according to a third aspect, the second switch (16; 16A; 16B) further includes a sixth terminal (163) in the first aspect. In the second switch (16; 16A, 16B), the fourth terminal (160; 160A, 160B) is connectable to at least the fifth terminal (161) or the sixth terminal (163). The radio frequency circuit (1A; 1C to 1F) further includes a matching circuit (25; 251, 252). The matching circuit (25; 251, 252) is connected between the sixth terminal (163) of the second switch (16; 16A, 16B) and the ground.

According to this aspect, the degradation of the receiving sensitivity due to the bunch loss can be reduced.

A radio frequency circuit (1A) according to a fourth aspect, the matching circuit (25) includes at least an inductor (251) or a capacitor (252) in the third aspect.

According to this aspect, the degradation of the receiving sensitivity due to the bunch loss can be reduced.

As for a radio frequency circuit (1B) according to a fifth aspect, the second switch (16) further includes the sixth terminal (163) in the first aspect. In the second switch (16), the fourth terminal (160) is connectable to at least the fifth terminal (161) or the sixth terminal (163). The sixth terminal (163) of the second switch (16) is not connected to any circuit while the fourth terminal (160) is not connected to the sixth terminal (163).

According to this aspect, the degradation of the receiving sensitivity due to the bunch loss can be reduced.

As for a radio frequency circuit (1A to 1F) according to a sixth aspect, in the second switch (16; 16A, 16B), the fourth terminal (160) is connected to the sixth terminal (163) in the case where the reception signal is received, and the transmission signal is not transmitted in any one of the third to fifth aspects.

According to this aspect, the degradation of the receiving sensitivity due to the bunch loss can be reduced.

A radio frequency circuit (1D to 1F) according to a seventh aspect further includes a second transmission filter (123) in any one of the first to sixth aspects. The second transmission filter (123) differs from a first transmission filter (121) that serves as the transmission filter (121). The first switch (15) further includes a bypass terminal (153). The second transmission filter (123) is connected to the bypass terminal (153) without interposing the second switch (16; 16A, 16B) therebetween. In the first switch (15), the first terminal (150) is connectable to at least the second terminal (151), the third terminal (152), or the bypass terminal (153).

According to this aspect, a loss can be reduced.

As for a radio frequency circuit (1; 1A; 1B) according to an eighth aspect, in the first switch (15), the third terminal (152) doubles as the second terminal (151) in any one of the first to seventh aspects. The multiple reception filters (111 to 114) are connected to the second terminal (151).

According to this aspect, the off capacitance of the first switch (15) can be reduced.

As for a radio frequency circuit (1C to 1F) according to a ninth aspect, the multiple reception filters (111 to 114) are connected to both of the second terminal (151) and the third terminal (152) of the first switch (15) in the first aspect. The radio frequency circuit (1C to 1F) further includes a matching circuit (23, 27). The matching circuit (23, 27) is not connected between the multiple reception filters (111 to 114) and the second terminal (151) of the first switch (15) but is connected between the multiple reception filters (111 to 114) and the third terminal (152) of the first switch (15).

According to this aspect, respective signal paths can be assigned to the case where only the reception signal is received and to the case where the reception signal is received, and the transmission signal is transmitted.

A radio frequency circuit (1F) according to a tenth aspect further includes multiple second reception filters (115 to 117) in the ninth aspect. The multiple second reception filters (115 to 117) differ from multiple first reception filters (111 to 114) that serve as the multiple reception filters (111 to 114). The first switch (15) includes a first specific terminal (151A) and a second specific terminal (151B) that serve as the second terminal and a third specific terminal (152A) and a fourth specific terminal (152B) that serve as the third terminal. The second switch (16) includes a fifth specific terminal (160B) and a sixth specific terminal (160A) that serve as the fourth terminal. The multiple first reception filters (111 to 114) are connected to the first specific terminal (151A) or the third specific terminal (152A) of the first switch (15). The multiple second reception filters (115 to 117) are connected to the second specific terminal (151B) or the fourth specific terminal (152B) of the first switch (15). The fifth specific terminal (160B) of the second switch (16) is connected to the first specific terminal (151A) of the first switch (15). The sixth specific terminal (160A) of the second switch (16) is connected to the second specific terminal (151B) of the first switch (15).

According to this aspect, the degradation of the receiving sensitivity due to the bunch loss can be reduced.

A radio frequency circuit (1E, 1F) according to an eleventh aspect further includes a first phase circuit (281) or a second phase circuit (282) in the tenth aspect. The first phase circuit (281) is connected between the first specific terminal (151A) of the first switch (15) and the fifth specific terminal (160B) of the second switch (16). The second phase circuit (282) is connected between the second specific terminal (151B) of the first switch (15) and the sixth specific terminal (160A) of the second switch (16).

According to this aspect, the degradation of the receiving sensitivity due to the bunch loss can be reduced.

As for a radio frequency circuit (1F) according to a twelfth aspect, in the second switch (16), the fifth specific terminal (160A) and the sixth specific terminal (160B) are simultaneously connectable to the fifth terminal (161) in the tenth or eleventh aspect.

According to this aspect, multiple transmission signals can be simultaneously transmitted.

A communication device (10) according to a thirteenth aspect includes the radio frequency circuit (1; 1A to 1F) in any one of the first to twelfth aspects and a signal processing circuit (2). The signal processing circuit (2) is connected to the radio frequency circuit (1; 1A to 1F).

According to this aspect, the degradation of the receiving sensitivity due to the bunch loss can be reduced.

REFERENCE SIGNS LIST 1, 1A to 1F radio frequency circuit
101 to 109 inductor
111 to 114 reception filter (first reception filter)
115 to 117 reception filter (second reception filter)

121 transmission filter (first transmission filter)
122 transmission filter
123 transmission filter (second transmission filter)
131 to 137 low-noise amplifier
14, 141, 142 power amplifier
15 first switch
150 common terminal (first terminal)
151 selection terminal (second terminal)
151A selection terminal (second terminal, first specific terminal)
151B selection terminal (second terminal, second specific terminal)
152 selection terminal (third terminal)
152A selection terminal (third terminal, third specific terminal)
152B selection terminal (third terminal, fourth specific terminal)
153 selection terminal (bypass terminal)
16, 16A, 16B second switch
160 common terminal (fourth terminal)
160A common terminal (fourth terminal, sixth specific terminal)
160B common terminal (fourth terminal, fifth specific terminal)
161 selection terminal (fifth terminal)
162 selection terminal
163 selection terminal (sixth terminal)
164 selection terminal
17 third switch
170 common terminal
171 to 174 selection terminal
180 inductor
181 to 184 input matching circuit
190 inductor
191 to 193 matching circuit
23 matching circuit
231 inductor
232 capacitor
24 matching circuit
241 inductor
242 capacitor
25, 253, 254 matching circuit
251 inductor
252 capacitor
26 matching circuit
260 inductor
27 matching circuit
271 inductor
272 capacitor
281 first phase circuit
282 second phase circuit
283 to 289 capacitor
2 signal processing circuit
21 RF signal processing circuit
22 baseband signal processing circuit
3 antenna
4 external connection terminal
41 antenna terminal
10 communication device
P1, P11, P12 connection point
R1, R11, R12 signal path
T1, T11, T12 signal path

The invention claimed is:

1. A radio frequency circuit comprising:
an antenna terminal;
a first transmission filter;

a second transmission filter that differs from the first transmission filter;
multiple reception filters;
a first switch that includes a first terminal, a second terminal, and a third terminal;
a second switch that includes a fourth terminal and a fifth terminal;
wherein in the first switch, the first terminal is connectable to the second terminal or the third terminal,
wherein in the second switch, the fourth terminal is connectable to the fifth terminal,
wherein the multiple reception filters are connected to the second terminal or the third terminal of the first switch,
wherein the first terminal of the first switch is connected to the antenna terminal,
wherein the fourth terminal of the second switch is connected to the second terminal of the first switch,
wherein the fifth terminal of the second switch is connected to the transmission filter,
wherein the second switch further includes a sixth terminal,
wherein in the second switch, the fourth terminal is connectable to at least the fifth terminal or the sixth terminal,
wherein the sixth terminal of the second switch is not connected to any circuit while the fourth terminal is not connected to the sixth terminal,
wherein in the second switch, the fourth terminal is connected to the sixth terminal in a case where a reception signal is received, and a transmission signal is not transmitted,
wherein the first switch further includes a bypass terminal to which the second transmission filter is connected without interposing the second switch therebetween, and
wherein in the first switch, the first terminal is connectable to at least the second terminal, the third terminal, or the bypass terminal.

2. The radio frequency circuit according to claim 1, further comprising:
a matching circuit that is connected between the second terminal of the first switch and the fourth terminal of the second switch.

3. The radio frequency circuit according to claim 1,
wherein the second switch further includes a sixth terminal,
wherein in the second switch, the fourth terminal is connectable to at least the fifth terminal or the sixth terminal, and
wherein a matching circuit is connected between the sixth terminal of the second switch and a ground.

4. The radio frequency circuit according to claim 3,
wherein the matching circuit includes at least an inductor or a capacitor.

5. The radio frequency circuit according to claim 4,
wherein in the second switch, the fourth terminal is connected to the sixth terminal in a case where a reception signal is received, and a transmission signal is not transmitted.

6. The radio frequency circuit according to claim 3,
wherein in the second switch, the fourth terminal is connected to the sixth terminal in a case where a reception signal is received, and a transmission signal is not transmitted.

7. The radio frequency circuit according to claim 1,
wherein in the first switch, the third terminal doubles as the second terminal, and wherein the multiple reception filters are connected to the second terminal of the first switch.

8. A radio frequency circuit, comprising:
an antenna terminal;
a transmission filter;
multiple reception filters;
a first switch that includes a first terminal, a second terminal, and a third terminal; and
a second switch that includes a fourth terminal and a fifth terminal,
wherein in the first switch, the first terminal is connectable to the second terminal or the third terminal,
wherein in the second switch, the fourth terminal is connectable to the fifth terminal,
wherein the multiple reception filters are connected to the second terminal or the third terminal of the first switch,
wherein the first terminal of the first switch is connected to the antenna terminal,
wherein the fourth terminal of the second switch is connected to the second terminal of the first switch,
wherein the fifth terminal of the second switch is connected to the transmission filter,
wherein the multiple reception filters are connected to both of the second terminal and the third terminal of the first switch, and
wherein a matching circuit is not connected between the multiple reception filters and the second terminal of the first switch but is connected between the multiple reception filters and the third terminal of the first switch.

9. The radio frequency circuit according to claim 8, further comprising:
multiple second reception filters that differ from multiple first reception filters that serve as the multiple reception filters,
wherein the first switch includes a first specific terminal and a second specific terminal that serve as the second terminal and a third specific terminal and a fourth specific terminal that serve as the third terminal,
wherein the second switch includes a fifth specific terminal and a sixth specific terminal that serve as the fourth terminal,
wherein the multiple first reception filters are connected to the first specific terminal or the third specific terminal of the first switch,
wherein the multiple second reception filters are connected to the second specific terminal or the fourth specific terminal of the first switch,
wherein the fifth specific terminal of the second switch is connected to the first specific terminal of the first switch, and
wherein the sixth specific terminal of the second switch is connected to the second specific terminal of the first switch.

10. The radio frequency circuit according to claim 9, further comprising:
at least a first phase circuit that is connected between the first specific terminal of the first switch and the fifth specific terminal of the second switch or a second phase circuit that is connected between the second specific terminal of the first switch and the sixth specific terminal of the second switch.

11. The radio frequency circuit according to claim 10, wherein in the second switch, the fifth specific terminal and the sixth specific terminal are simultaneously connectable to the fifth terminal.

12. The radio frequency circuit according to claim 9, wherein in the second switch, the fifth specific terminal and the sixth specific terminal are simultaneously connectable to the fifth terminal.

13. The radio frequency circuit according to claim 8, further comprising:
a second transmission filter that differs from a first transmission filter that serves as the transmission filter,
wherein the first switch further includes a bypass terminal to which the second transmission filter is connected without interposing the second switch therebetween, and
wherein in the first switch, the first terminal is connectable to at least the second terminal, the third terminal, or the bypass terminal.

14. A communication device comprising:
the radio frequency circuit according to claim 11; and
a signal processing circuit that is connected to the radio frequency circuit.

15. A radio frequency circuit, comprising:
an antenna terminal;
a first transmission filter;
a second transmission filter that differs from the first transmission filter;
multiple reception filters;
a first switch that includes a first terminal, a second terminal, and a third terminal; and
a second switch that includes a fourth terminal and a fifth terminal,
wherein in the first switch, the first terminal is connectable to the second terminal or the third terminal,
wherein in the second switch, the fourth terminal is connectable to the fifth terminal,
wherein the multiple reception filters are connected to the second terminal or the third terminal of the first switch,
wherein the first terminal of the first switch is connected to the antenna terminal,
wherein the fourth terminal of the second switch is connected to the second terminal of the first switch,
wherein the fifth terminal of the second switch is connected to the transmission filter,
wherein the first switch further includes a bypass terminal to which the second transmission filter is connected without interposing the second switch therebetween, and
wherein in the first switch, the first terminal is connectable to at least the second terminal, the third terminal, or the bypass terminal.

16. A communication device comprising:
the radio frequency circuit according to claim 1; and
a signal processing circuit that is connected to the radio frequency circuit.

17. A communication device comprising:
the radio frequency circuit according to claim 8; and
a signal processing circuit that is connected to the radio frequency circuit.

18. A communication device comprising:
the radio frequency circuit according to claim 15; and
a signal processing circuit that is connected to the radio frequency circuit.

* * * * *